(12) United States Patent
Bhaskaran et al.

(10) Patent No.: US 8,923,863 B2
(45) Date of Patent: Dec. 30, 2014

(54) MAINTAINING SIGNALING REDUCTION MODE IN COMMUNICATION NETWORKS

(75) Inventors: Sridhar Bhaskaran, Coimbatore (IN); Aditya Prakash, Distt. Hathras (IN); Hassan Khani Sidhiq, Bangalore (IN); Ramakumar Rajagopalan, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 475 days.

(21) Appl. No.: 13/330,079

(22) Filed: Dec. 19, 2011

(65) Prior Publication Data

US 2013/0157661 A1    Jun. 20, 2013

(51) Int. Cl.
*H04W 36/00* (2009.01)

(52) U.S. Cl.
USPC ........................................ 455/436; 455/127.4

(58) Field of Classification Search
CPC .............................. H04W 60/00; H04W 48/12
USPC ........ 455/432.1–434, 435.1–435.3, 436–444; 370/321–334
See application file for complete search history.

(56) References Cited

U.S. PATENT DOCUMENTS

| | | | |
|---|---|---|---|
| 7,855,991 | B2 | 12/2010 | Hu |
| 8,077,675 | B2 | 12/2011 | Stephenson et al. |
| 2008/0104210 | A1 | 5/2008 | Ramankutty |
| 2010/0056146 | A1 | 3/2010 | Guo et al. |
| 2010/0064038 | A1 | 3/2010 | Hu |
| 2010/0118830 | A1 | 5/2010 | Stephenson et al. |
| 2011/0110308 | A1 * | 5/2011 | Liang et al. .................... 370/328 |
| 2014/0086068 | A1 * | 3/2014 | Borsos et al. .................. 370/248 |
| 2014/0105028 | A1 * | 4/2014 | Bhaskaran et al. ............ 370/242 |

OTHER PUBLICATIONS

3GPP TS 23.401 V10.3.0 (Mar. 2011): 3rd Generation Partnership Project; Technical Specification Group Services and System Aspects; General Packet Radio Service (GPRS) enhancements for Evolved Universal Terrestrial Radio Access Network (E-UTRAN) access (Release 10), hereinafter TS23.401.*

3GPP TS 23.401 v10.3.0. Technical Specification. 3rd Generation Partnership Project; Technical Specification Group Services and System Aspects; General Packet Radio Service (GPRS) Enhancements for Evolved Universal Terrestrial Radio Access Network (E-UTRAN) Access (Release 10). Mar. 2011. 278 pages.

(Continued)

*Primary Examiner* — Ronald Eisner
(74) *Attorney, Agent, or Firm* — Wilmer Cutler Pickering Hale and Dorr LLP

(57) ABSTRACT

In one embodiment, a method comprises activating a signaling reduction mode on a wireless access node for a mobile device in an idle state where the signaling reduction mode permits the mobile device to switch radio access technologies while maintaining registration with both the wireless access node and a peer wireless access node, exchanging with the peer wireless access node a first control tunnel identifier of the wireless access node and a second control tunnel identifier of the peer wireless access node, selecting at the wireless access node a second gateway to replace a first gateway, establishing a control connection with the second gateway, transmitting to the second gateway the second control tunnel identifier of the peer wireless access node so that the second gateway may establish a control connection with the peer wireless access node, and continuing the signaling reduction mode.

20 Claims, 18 Drawing Sheets

(56) References Cited

OTHER PUBLICATIONS

3GPP TS 23.857 v1.4.0. Technical Specification. 3rd Generation Partnership Project; Technical Specification Group Core Network and Terminals; Study of EPC Nodes Restoration; (Release 11). Aug. 2011. 46 pages.

3GPP TS 29.274 v10.3.0. Technical Specification. 3rd Generation Partnership Project; Technical Specification GRoup Core Network and Terminals; 3GPP Evolved paker System (EPS); Evolved General Packer Radio Service (GPRS) Tunnelling Protocol for Control Plane (GTPv2-C); Stage 3 (Release 10). 186 pages.

European Search Report for European Patent Application No. 12169626.4 mailed Nov. 19, 2012. 9 pages.

Huawaei. "Context Identifier." 3GPP Draft; C-4112296_Context Identifier_29274_R11, 3rd Generation Partnership Project (3GPP), Mobile Competence Centre; 650, Route Des Lucioles; F-06921 Sophia-Antipolis Cedez; France. vol. CT WG4. No. Hyderabad; Oct. 1, 2011; XP050536167. 16 pages.

* cited by examiner

US 8,923,863 B2

MAINTAINING SIGNALING REDUCTION MODE IN COMMUNICATION NETWORKS

FIELD OF THE DISCLOSURE

The present disclosure relates generally to a system and method for providing a persistent signaling reduction mode within a telecommunications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) as long as the user is within range of such a wireless communication technology.

Each wireless communication technology has a corresponding radio access technology. In some geographical areas, network connectivity is achieved through a combination of radio access technologies. For example, as a new generation of radio access technologies are made available in an area, a mobile device is likely to receive a mix of service from a new generation radio access technology (e.g., E-UTRAN) and a previous generation radio access technologies (e.g., GERAN/UTRAN), switching between them often. The Idle state Signaling Reduction (ISR) mode, once activated, allows a mobile device to reselect between available radio access technologies with reduced radio signaling.

DESCRIPTION OF EXAMPLE EMBODIMENTS

Overview

Figure 1:
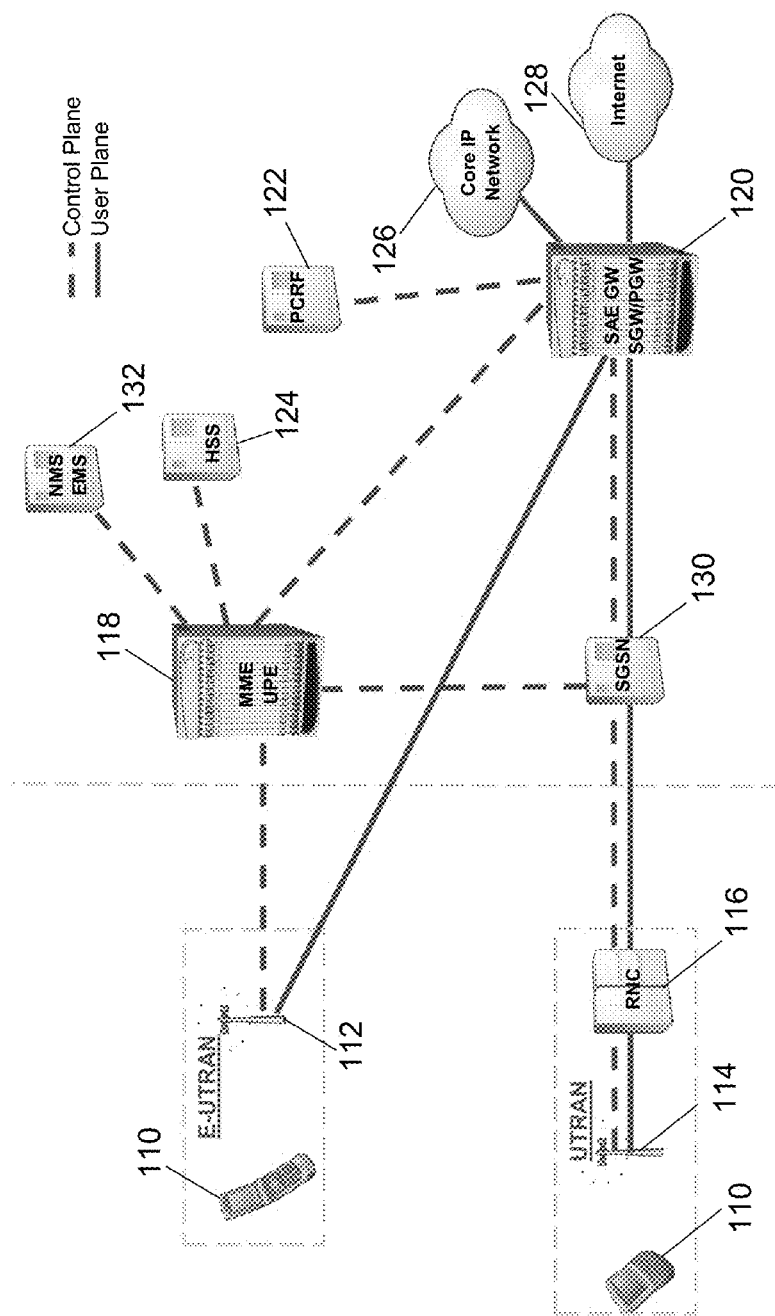
FIG. 1 illustrates a communications network in accordance with some embodiments.

Certain embodiments disclose a method comprising activating a signaling reduction mode on a wireless access node for a mobile device in an idle state where the signaling reduction mode permits the mobile device to switch radio access technologies while maintaining registration with both the wireless access node and a peer wireless access node, exchanging with the peer wireless access node a first control tunnel identifier of the wireless access node and a second control tunnel identifier of the peer wireless access node, selecting at the wireless access node a second gateway to replace a first gateway, establishing a control connection with the second gateway, transmitting to the second gateway the second control tunnel identifier of the peer wireless access node so that the second gateway may establish a control connection with the peer wireless access node, and continuing the signaling reduction mode.

Example Embodiments

This disclosure relates generally to maintaining a signaling reduction mode for mobile devices in a communication network. Mobile devices such as smartphones, cell phones, and data-cards have continued to proliferate at a rapid pace. At the same time, the networks that serve these devices have continued to evolve. New generations of networks provide faster connections, increased reliability and improved user experiences. The deployment of these new networks often involves extensive rollout of new hardware that is achieved in phases of gradually increasing geographic scope. In areas where new networks are being rolled out, the network coverage available to mobile device users may be a mixture of old and new technologies. Users in these areas are likely to make use of several generations of technology and to transition between them frequently. Network handover procedures can make these transitions seamless to users.

Network handover procedures allow a mobile device to maintain its network registration while roaming within the network. For example, a network handover procedure may occur when a user with a mobile device moves out of the range of one wireless transceiver and into the range of a new wireless transceiver that is part of the same network. The handover procedure may be initiated when the new transceiver receives a location update request message from the mobile device. This location update message indicates that the mobile device is requesting service from the new transceiver. In response, the nodes of the network exchange the information that is used to reconfigure the network and begin serving the mobile device from the new transceiver. A network handover procedure that accommodates a change from a transceiver using one radio access technology (RAT) to a transceiver using a different radio access technology is known as an inter-radio access technology handover. Idle mode signaling reduction (ISR) is a signaling reduction mode that, once activated, reduces resource-intensive radio signaling during an inter-radio access technology handover. This disclosure describes some embodiments that continue ISR activation on certain categories of network handovers.

ISR works in areas that are served by both a GSM EDGE Radio Access Network (GERAN) or a UMTS Terrestrial Radio Access Network (UTRAN) and an evolved UMTS Terrestrial Radio Access Network (E-UTRAN). ISR, once activated, reduces the radio signaling that occurs during an inter-radio access technology handover between the GERAN/UTRAN radio access technology and the E-UTRAN radio access technology. A mobile device registers with a network through an initial attach procedure. ISR activation occurs, for example, when a mobile device already registered, or attached, using E-UTRAN roams into the range of a transceiver or base station using GERAN/UTRAN. In these cases, ISR is activated during the subsequent handover procedure run through GERAN/UTRAN. Once activated, ISR allows the mobile device to be simultaneously registered through both E-UTRAN and GERAN/UTRAN. A device that is simultaneously registered with both types of networks can reselect between them without re-registering. As such, a mobile device with ISR activated can roam freely between E-UTRAN and GERAN/UTRAN radio access technologies without the need to re-register. Network registration is a procedure that expends device battery life and network resources.

Both the E-UTRAN and GERAN/UTRAN radio access technologies interact with a wireless access network to provide network services. In areas served by both E-UTRAN and GERAN/UTRAN, this wireless access network contains nodes used to interface, control, and carry traffic on behalf of both base stations using both radio access technologies. A mobile device registers with the access network and specifically with an access node to receive network services using a radio access technology. The access node includes network equipment in the access or core network that provide services to one or more mobile devices. The access node can be, for example, an MME, an SGSN, an SGW, a PGW, a PCRF, a GGSN, a PDSN, or any other applicable network device. The access node in some embodiments may include one or more of these functionalities. During ISR activation, the wireless access nodes exchange the information used to maintain parallel mobile device registration through both radio access technologies. A mobile device may move within a network once registered. As this occurs, new access nodes may be swapped with previously used access nodes to better serve the mobile device at its new location. These access nodes may also be swapped during a network handover procedure. In existing network implementations, the state stored during ISR activation is lost when access nodes are swapped. Thus, ISR is deactivated in these cases. This disclosure describes some embodiments where ISR activation is continued even when a network handover causes an access node to be swapped.

ISR is an important mechanism to reduce the amount of wireless signaling sent to and from mobile devices that frequently reselect between E-UTRAN and GERAN/UTRAN radio access technologies. This reduction in signaling saves mobile device battery life and reduces load on the wireless spectrum. Thus, it is important to continue ISR activation even upon network handovers that cause an access node to be swapped. This disclosure describes some embodiments where the wireless access network nodes can distribute and store information during ISR activation to enable ISR continuation in the case of such a swap. This disclosure also describes embodiments where the wireless access network uses this stored information during such a swap to update the swapped-in access node with the information stored by the swapped-out access node. In these embodiments, the swapped-in node is able to continue ISR in place of the swapped-out node because of the stored information. Signaling reduction modes other than ISR, and mobile device selection between radio access technologies other than E-UTRAN and GERAN/UTRAN are other embodiments.

FIG. 1 illustrates a network diagram in accordance with certain embodiments. FIG. 1 illustrates a universal mobile telecommunication system (UMTS) network along with a LTE network. The network diagram of FIG. 1 includes user equipment (UE) 110, an evolved nodeB (eNB) 112, a nodeB (NB) 114, a radio network controller (RNC) 116, a mobility management entity (MME) or user plane entity (UPE) 118, a system architecture evolution gateway (SAE GW) 120, a policy and charging rules function (PCRF) 122, home subscriber server (HSS) 124, core IP network 126, internet 128, Serving General packet radio service Support Node (SGSN) 130, and network management system (NMS)/element management system (EMS) 132. The MME 118, SGSN 130, and SAE GW 120 can be implemented in a gateway as described below. The SAE GW 120 can include a serving gateway (SGW) as well as a packet data network gateway (PGW). In some embodiments, the SGW and PGW can be implemented on separate network devices. The main component of the SAE architecture is the Evolved Packet Core (EPC), also known as SAE Core. The EPC includes the MME, SGW and PGW components. The user equipment (UE) can include a mobile phone, a laptop with wireless connectivity, a netbook, a smartphone, or any other wireless device.

MME 118 is a control-node for the LTE access network. The MME 118 is responsible for UE 110 tracking and paging procedures including retransmissions. MME 118 handles the bearer activation/deactivation process and is also responsible for choosing the SGW for a UE 110 at the initial attach and at time of an intra-LTE handover. The MME 118 also authenticates the user by interacting with the HSS 124. The MME 118 also generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs. The MME 118, the SGSN 130 and the SAE GW 120 are all part of the wireless access network. The wireless access network provides network access to radio access networks. The radio access networks include the eNB 112 and the RNC 116/NB 114.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 110. The SGW manages and stores UE contexts, e.g., parameters of the IP bearer service and network internal routing information. The SGW also performs replication of the user traffic in case of lawful interception. The P-GW provides connectivity to the UE 110 to external packet data networks by being the point of exit and entry of traffic for the UE 110. A UE 110 may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as those known by the marks and names WiMAX and 3GPP2 (CDMA 1X and EvDO).

The NMS/EMS 132 can provide management of the operation, administration, maintenance, and provisioning of networked system. Operation deals with keeping the network (and the services that the network provides) up and running smoothly, and includes monitoring to detect problems and minimize disruptions on the network. Administration deals with keeping track of resources in the network and how they are assigned. Maintenance is concerned with performing repairs and upgrades—for example, when equipment must be replaced, when a router needs a patch for an operating system image, when a new switch is added to a network. Provisioning is concerned with configuring resources in the network to support a given service. For example, this might include setting up the network so that a new customer can receive service. Functions that are performed as part of network management accordingly include controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, and accounting management. An element management system (EMS) consists of systems and applications that manage network elements (NE) on the network element management layer (NEL) of the Telecommunication Management Network model.

The user equipment (UE) may be in an active or an idle state. Whether the UE is in an active state can depend on the state of a packet data session, and whether there is an active packet data session. The idle state is a sleep mode state that can be used to conserve battery life of user equipment by minimizing the need to power receivers to be ready for radio signals. The paging indicators are usually sent from a number of cells because user equipment may move while in an idle state. For user equipment in an idle state, the SGW can buffer IP packets received for the user equipment and can initiate page requests towards the MME or SGSN. For user equipment with ISR activated, the SGW may initiate page requests towards both the MME and the SGSN. If the user equipment responds to the page, the SGW forwards the IP packet to the eNB in a LTE network or to a RNC/NB or SGSN in UMTS/ general packet radio service (GPRS) for delivery to the user equipment.

A UE first registers itself with an LTE network by initiating an Initial Attach procedure across E-UTRAN. During the initial attach procedure, the UE identifies itself to an E-UTRAN base station and requests to be served by the wireless access network. Within the wireless access network, the HSS interacts with the MME to authenticate the user and approve the attach request. Following authentication, a connection may be established between the UE and the SGW for the transmission of traffic to a packet data network (PDN). This process is known as Evolved Packet System (EPS) Bearer Activation. During EPS Bearer Activation, a connection tunnel is established between the UE and the PGW to carry a particular type of data, such as a voice conversation or streaming video. This connection passes through the SGW to the PGW. Specific forwarding and quality-of-service parameters are also configured as appropriate for the type of data that is to be sent. The portion of the tunnel from the SGW to the UE is called an E-UTRAN Radio Access Bearer (E-RAB). Once the UE has been authenticated and bearers have been established, the UE is attached to the network and has access to the packet data network.

With E-UTRAN used in an LTE network, each UE may be located in one or more Tracking Areas. A Tracking Area defines a collection of eNBs that are geographically nearby. Each Tracking Area is defined by a Tracking Area Identity (TAI). To facilitate tracking of a UE, UEs periodically transmit Tracking Area Update (TAU) Request messages once attached to the network. A Tracking Area Update Request message is an example of a location update request message. Each Tracking Area Update Request message contains the Tracking Area Identity associated with the Tracking Area in which the UE is located. Upon receipt of a Tracking Area Update Request message, the wireless access network runs the Tracking Area Update procedure. During a Tracking Area Update procedure, the wireless access network may assign a new MME, a new SGW, or both, to serve the UE. The wireless access network will assign these wireless access nodes based on the Tracking Area Identity included in the request. The reassignment occurs as part of a network handover procedure. At the conclusion of a Tracking Area Update procedure, the wireless access network sends a Tracking Area Update Accept message to the UE. This message includes a list of Tracking Area Identities within which an idle state UE may move without signaling the core network.

Similarly, with GERAN/UTRAN, a UE is located in a Routing Area. Like Tracking Areas, each Routing Area defines a collection of nodeBs that are geographically nearby. Each Routing Area is located within a location area. A Routing Area is defined by a Routing Area Identifier (RAI), which comprises a Routing Area Code, a Location Area Code, a Mobile Network Code (MNC), and a Mobile Country Code (MCC). As with Tracking Area Update Request messages, UEs periodically issue Routing Area Update (RAU) Request messages once attached to the network. A Routing Area Update Request message is another example of a location update request message. A Routing Area Update Request message contains the Routing Area Identities associated with both the UE's current and previous Routing Area. Upon receipt of a Routing Area Update Request message, the wireless access network runs the Routing Area Update procedure. The Routing Area Update procedure may cause the wireless access network to assign to new SGSN, a new SGW, or both, to serve the UE as part of a network handover procedure. The wireless access network assigns these nodes during such a handover procedure based on the Routing Area Identities included in the request. Both Routing Area Update Request messages and Tracking Area Update Request messages are types of location update request messages.

The Routing Area Update and Tracking Area Update procedures are each comprised of a series of messages sent from one access node to another access node. Groups of sequential messages can be conceptually grouped into message flows which accomplish a discrete portion of a procedure. These message flows include a bearer modification message flow, a context exchange message flow, and a location update message flow. The bearer modification message flow modifies the route of the bearers established during initial attach. The context exchange message flow occurs when a UE initiates a Routing Area Update or Tracking Area Update procedure in an area served by a different MME or SGSN than had previously served the UE. This flow may transmit UE mobility management context information from the old MME to the new MME or from the old SGSN to the new SGSN. Mobility management context information includes any information that is used by the wireless access network to serve a particular UE, including the information used to maintain the bearers for the UE. This exchange gives the new MME or new SGSN the information used to serve the UE in place of the old MME or old SGSN. Alternatively, the context exchange message flow may transmit UE mobility management context information from an MME to an SGSN or from an SGSN to an MME. The location update message flow distributes up-to-date information on the location of a UE throughout the wireless access network. The location update message flow begins with new UE location information being sent to the HSS in an Update Location message. The HSS stores the location information. The Update Location message may also contain Update Location Request (ULR) flags which can either have an Initial Attach indicator either set or not set. If the Update Location Request flags have the Initial Attach indicator set, the flow proceeds with the HSS notifying both peer wireless access nodes in an ISR configuration to remove the UE's location from their records. If this indicator is not set, the flow proceeds with the HSS notifying a swapped-out wireless access node to remove the UE's location from its records. These notifications are sent as Cancel Location messages.

If a UE is attached to a network through a GERAN/UTRAN radio access technology it may later move to an area served by E-UTRAN. If a UE detects such a move, it sends a Tracking Area Update request to register using the E-UTRAN interface. Similarly, a UE attached to a network using E-UTRAN may later move to any area served by GERAN/UTRAN and issue a Routing Area Update. In areas where LTE is not fully deployed and legacy GERAN/UTRAN radio access technology coverage is interworked with E-UTRAN radio access technology coverage, a UE is likely to frequently move between these radio access technologies. Without special functionality, an idle-mode UE that selects to change radio access technologies (from GERAN/UTRAN to E-UTRAN or from E-UTRAN to GERAN/UTRAN), issues either a Routing Area Update or Tracking Area Update request, respectively. Issuing a Routing Area Update or Tracking Area Update drains UE battery power and uses processing resources. As well, the receipt and processing of a Tracking Area Update request by an MME or a Routing Area Update request by a SGSN uses network resources.

The idle mode signal reduction (ISR) function, described in 3GPP TS 23.401, Appendix J, enables signaling reduction by reducing the frequency of Routing Area Update and Tracking Area Update procedure initiations when a UE is registered with separate SGSN and MME nodes. With ISR, both the SGSN and MME nodes can have control connections with a single SGW. The ISR function is enabled by special functionality in the UE and the MME, SGSN and SGW nodes. The MME/SGSN will activate ISR for a UE only if the SGW can support ISR. ISR activation occurs when a UE that is attached to an MME using E-UTRAN later reselects GERAN/UTRAN and initiates a Routing Area Update procedures. Through ISR activation, the UE becomes registered with both an MME and an SGSN, both of these nodes storing associated mobility management information for their registration with the UE. The mobility management parameters stored by the SGSN include the associated Routing Area and Packet Temporary Mobile Subscriber Identity (P-TMSI) of the UE. The mobility management parameters stored by the MME are the associated Tracking Areas and Globally Unique Temporary ID (GUTI) of the UE. Once this information is stored and ISR is activated, an idle state UE can reselect between E-UTRAN and GERAN/UTRAN (within the registered Routing Area and Tracking Areas) without initiating a Tracking Area Update or Routing Area Update procedure. When ISR is activated and downlink data arrives, the SGW initiates paging processes through both the SGSN and MME, these nodes acting as peers to page the UE in parallel. In response to such paging, or for uplink data transfer, the UE can perform normal service request procedures using either radio access technology (e.g., either E-UTRAN or GERAN/UTRAN).

ISR is activated with respect to a UE if the UE is registered with both an MME and a SGSN. The MME and SGSN act as peers to serve the UE in parallel. Thus, both the MME and the SGSN have a control connection with the SGW. A control connection may be a logical link or a session that is established at the connection endpoints to communicate data. The control connection may be communicated over wired mediums, wireless mediums, or a combination of the two. The MME and SGSN forward paging requests in parallel, as sent by the SGW using these connections. Control connections are used to manage and support user plane functions. Each control connection is modeled as a tunnel with two endpoints. A tunnel endpoint may be defined by a Fully Qualified Tunnel Endpoint Identifier (F-TEID). An F-TEID contains the Internet Protocol (IP) address of the endpoint plus a tunnel endpoint identifier. A tunnel endpoint identifier is allocated to define a tunnel that carries data for a particular UE (e.g., an identifier for a particular UE's connection between an MME and an SGW), and to distinguish between F-TEIDs which define tunnels to carry data other UEs. For example, a first node's F-TEID towards a second node includes the IP address of the first node and identifies a tunnel used to carry data related to a particular UE from the second node to the first node. The second node's F-TEID towards the first node includes the IP address of the second node and a tunnel endpoint identifier which identifies the tunnel as carrying traffic for that same UE, from the first node to the second node. Thus, when ISR is activated, the SGW stores the MME's F-TEID towards SGW and the SGSN's F-TEID towards SGW. These F-TEIDs are used by the SGW to communicate with the MME and the SGSN, respectively, on behalf of a particular UE. Both the MME and the SGSN store the SGW's F-TEID to communicate with the SGW on behalf of that UE. When data arrives at the core network for a UE with ISR activated, the SGW sends a notification to both the MME and the SGSN using these control tunnels. The MME and SGSN initiate their paging procedures in parallel.

When ISR is activated for a UE, that UE stores mobility management parameters associated with both an MME and an SGSN. One of these parameters is the "Temporary Identity used in Next update (TIN)" field. A UE's "Temporary Identity used in Next update" field defines which temporary identity a UE will use in its next Routing Area Update or Tracking Area Update request. A "UE's Temporary Identity used in Next update" field may have one of the following values: Packet Temporary Mobile Subscriber Identity, Globally Unique Temporary Identity (GUTI) or radio access technology-related Temporary Mobile Subscriber Identity (RAT-related TMSI). A "Temporary Identity used in Next update" field equal to "Packet Temporary Mobile Subscriber Identity" indicates that the UE is attached via GERAN/UTRAN coverage and will send its Packet Temporary Mobile Subscriber Identity value in its next location update. A "Temporary Identity used in Next update" field equal to GUTI indicates that the UE is attached via E-UTRAN coverage and will send the GUTI that was assigned to the UE during the initial attach procedure in its next location update. A "Temporary Identity used in Next update" field equal to "RAT-related TMSI" indicates that ISR is activated for the UE. In this case, the UE simultaneously stores mobility management parameters from both an SGSN and an MME. For the connection to the SGSN, the UE stores a Packet Temporary Mobile Subscriber Identity and a Routing Area Identity. For the connection to the MME, the UE also stores a GUTI and one or more Tracking Area Identities. In this case, the UE's Packet Temporary Mobile Subscriber Identity and Routing Area Identity as well as its GUTI and Tracking Area Identity or Tracking Area Identities remain registered with the network. The UE is free to reselect between E-UTRAN and GERAN/UTRAN within its registered routing and Tracking Areas in this state without running a Routing Area Update or Tracking Area Update procedure.

Existing ISR implementations deactivate ISR when the UE leaves the Routing Area or Tracking Areas in which ISR was initially activated. A UE's departure from a Routing Area or Tracking Area may result in the selection of a new MME, a new SGSN or a new SGW during a Routing Area Update procedure or a Tracking Area Update procedure. Existing ISR implementations do not contain functionality to continue ISR upon this type of access node change. As ISR is presently specified, the state information stored in the UE, MME and SGSN would become unsynchronized on occurrence of access node change and ISR would be deactivated. Some embodiments of this disclosure allow ISR continuation upon SGSN change, MME change or SGW changes. Other embodiments allow for ISR continuation upon SGSN and SGW change or MME change and SGW changes.

To support ISR continuation, an improved ISR activation method includes the exchange and storage of information used to update new wireless access nodes that are swapped in during Tracking Area Update or Routing Area Update procedures. In some embodiments, the MME sends its F-TEID towards SGW to the SGSN. An MME's F-TEID towards SGW includes the Internet Protocol (IP) address of the MME and a tunnel endpoint identifier (an identifier used to identify a particular UE's connection towards an SGW). As well, the SGSN sends its F-TEID towards SGW to the MME. An SGSN's F-TEID towards SGW includes the IP address of the SGSN and a tunnel endpoint identifier (an identifier used to identify a particular UE's connection towards an SGW). This information, once exchanged, enables an access node to initiate an ISR update message flow with another access node during a subsequent Routing Area Update or Tracking Area Update procedure. The ISR update message flow brings a new access node up-to-date with the information used to continue ISR and prevents ISR state information from becoming unsynchronized.

If a new MME is swapped in for an old MME upon during a Tracking Area Update procedure, the old MME informs the new MME of the SGSN's tunnel information towards MME and SGW. Using this tunnel information, the new MME initiates an ISR update message flow to inform the SGSN of its new tunnel information towards the SGW and the SGSN. This connection from the new MME to the SGW allows the new MME to serve the UE in parallel with the SGSN. ISR can thus be continued because, as when ISR was activated, there remains an MME and an SGSN with connections to the SGW. Similarly, if a new SGSN is swapped in for an old SGSN during a Routing Area Update procedure, the old SGSN brings the new SGSN up-to-date with tunnel information used by the MME towards the SGSN and the SGW. In turn, the new SGSN informs the MME about its tunnel information towards the SGW by initiating an ISR update message flow. ISR continuation can also be achieved when an MME or SGSN selects a new SGW by informing the peer SGSN or peer MME, respectively, of the new SGW's F-TEID. An SGW's F-TEID includes the IP address of the SGW and a tunnel endpoint identifier used to identify a UE's connection by an MME or SGSN towards the SGW.

Figure 2A:
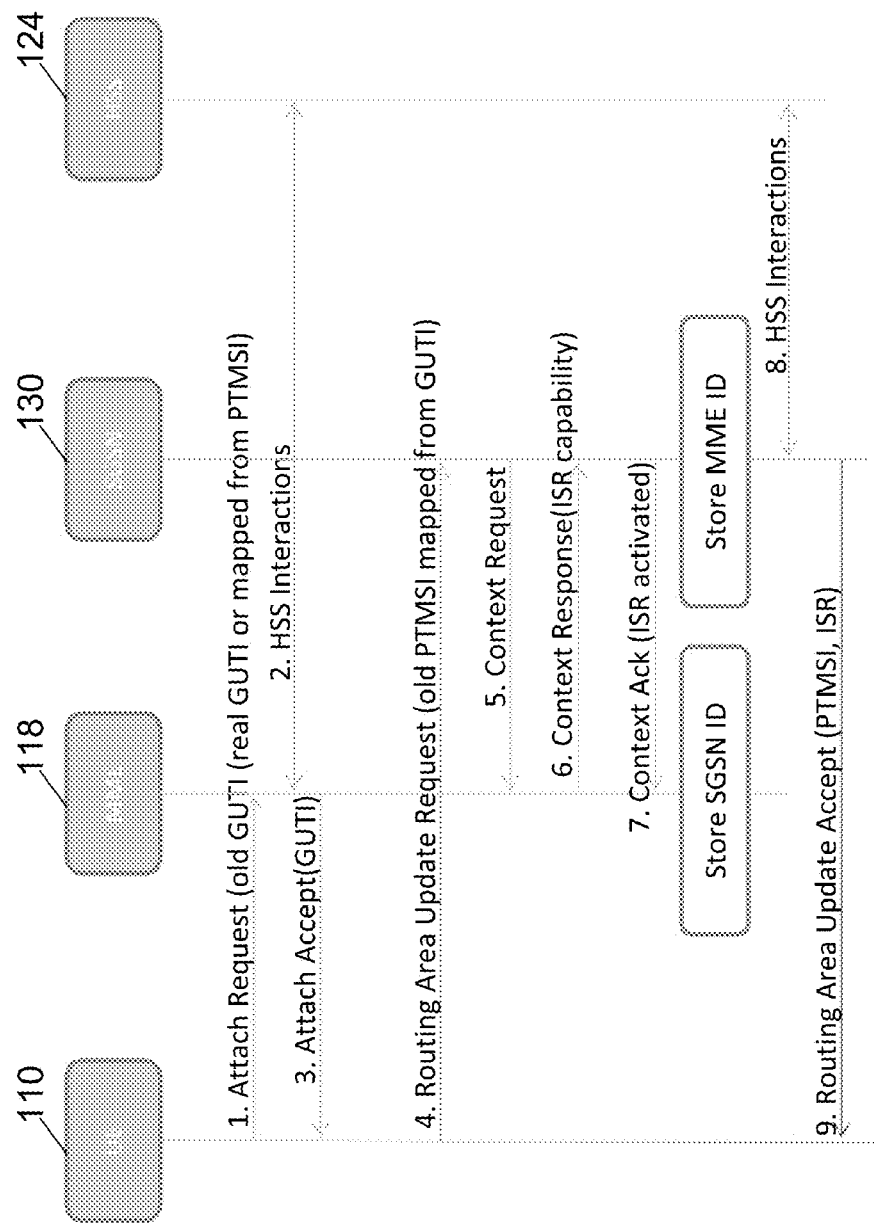
FIG. 2A is a message diagram illustrating idle mode signaling reduction activation.

FIG. 2A is a message diagram illustrating a method of ISR activation. FIG. 2A includes UE 110, an MME 118, an SGSN 130, and an HSS 124. The attach procedure begins with the UE 110 sending an Attach Request message to the MME 118 in Step 1. This message contains the UE's GUTI, which is either an actual GUTI or one mapped from the UE's Packet Temporary Mobile Subscriber Identity, depending on the UE's "Temporary Identity used in Next update" field as described above. In Step 2, the MME 118 and the HSS 124 interact to authenticate the UE 110 based on the GUTI sent in Step 1. If the MME 118 authenticates the UE 110, it sends an Attach Accept message to the UE 110 in Step 3. This message contains the UE's new GUTI as allocated by the access network. After Step 3, the UE 110 is able to interact with the network via E-UTRAN.

Following Steps 1-3, the UE 110 may move to an area with GERAN/UTRAN coverage. Upon detecting this radio access technology change, the UE 110 sends a Routing Area Update message in Step 4. This message contains the UE's Packet Temporary Mobile Subscriber Identity mapped from the GUTI received in Step 3. This message is received by a GERAN/UTRAN base station and passed on to the SGSN 130. As the UE 110 is already attached via E-UTRAN, this represents an opportunity to activate ISR. To do so, the SGSN 130 initiates a context exchange message flow with the MME 118. The SGSN 130 initiates this flow by sending a Context Request message to the MME 118 in Step 5. In Step 6, the MME 118 responds by sending a Context Response message including the requested context information and indicating that it is capable of operating in ISR mode. The SGSN 130 confirms receipt of the context information and that ISR mode is activated by sending a Context Acknowledge message in Step 7. After Step 7, both the MME 118 and the SGSN 130 have stored the UE context information and have parallel control connections with an SGW (not shown). In Step 8, the SGSN 130 and HSS 124 interact to authenticate the UE 110 based on the Packet Temporary Mobile Subscriber Identity sent in Step 4. In Step 9, the SGSN 130 responds to the UE 110 with a Routing Area Update Accept message containing the UE's new Packet Temporary Mobile Subscriber Identity. This message also indicates to the UE 110 that ISR is activated. The Routing Area Update procedure is complete and ISR is activated.

Figure 2B:
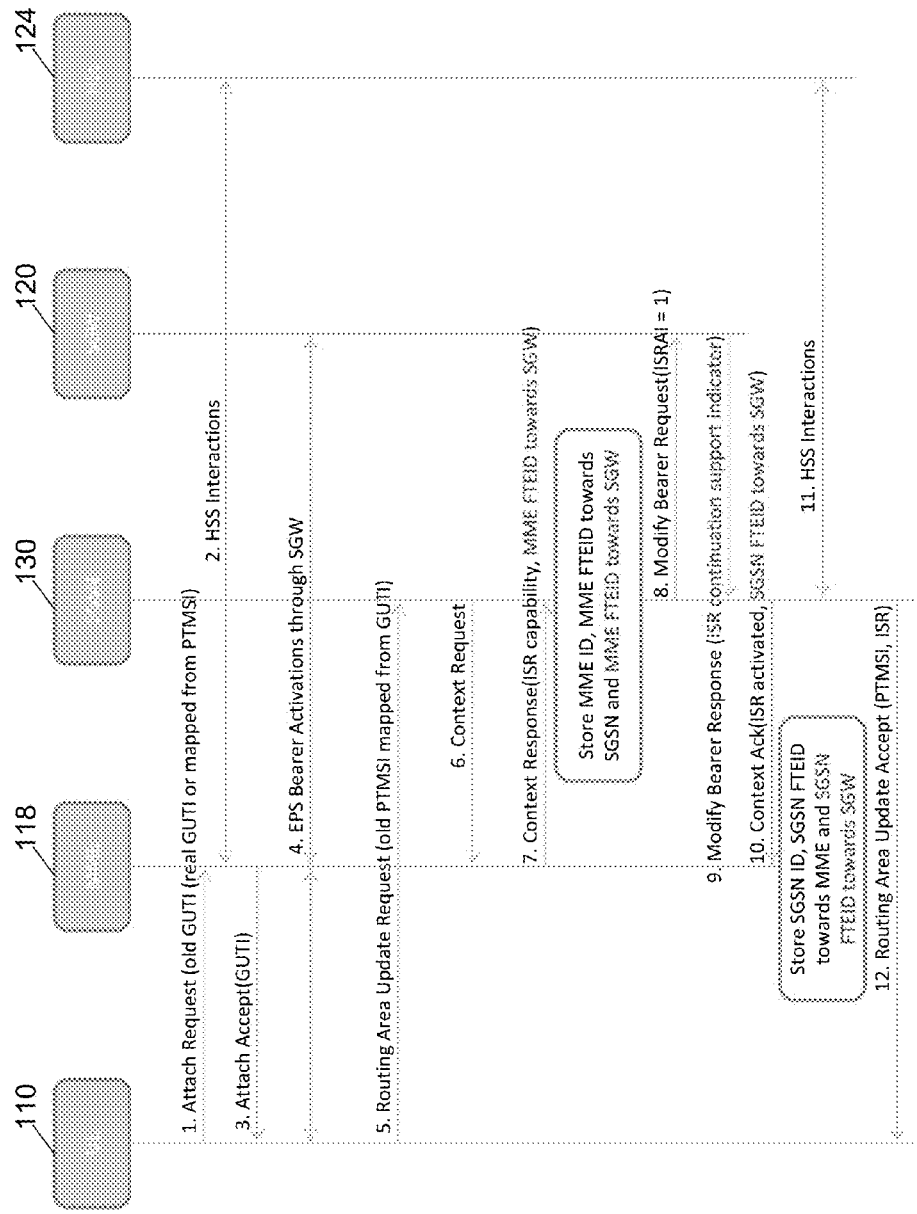
FIG. 2B is a message diagram illustrating idle mode signaling reduction activation in accordance with some embodiments.

FIG. 2B is a message diagram illustrating a method of activating ISR to enable ISR continuation in accordance with some embodiments. FIG. 2B includes UE 110, an MME 118, an SGSN 130, an SGW 120, and an HSS 124. The UE 110, the MME 118, the SGSN 130, and the SGW 120 can support ISR. Furthermore, the MME 118, the SGSN 130, and the SGW 120 can support ISR continuation. An Initial Attach procedure begins with the UE 110 sending an Attach Request message in Step 1. This Initial Attach procedure does not require any special functionality for support of ISR or ISR continuation. As in FIG. 2A, the Attach Request message contains the UE's GUTI, which is either an actual GUTI or one mapped from the UE's Packet Temporary Mobile Subscriber Identity, depending on the UE's "Temporary Identity used in Next update" field. In Step 2, the MME 118 and the HSS 124 interact to authenticate the UE 110 based on the GUTI sent in Step 1. If the UE 110 is properly authenticated, the MME 118 sends an Attach Accept message to the UE 110 in Step 3. This message contains the UE's new GUTI as allocated by the access network. This message does not indicate that ISR is activated and so any ISR state information stored by the UE 110 is cleared. After Step 3, the UE 110 is able to interact with the network via E-UTRAN and ISR is deactivated. In Step 4, bearers are established for the UE 110.

An opportunity to activate ISR arises when the UE 110 has been moved from an area served by an E-UTRAN base station and into an area served by a GERAN/UTRAN base station. When the UE 110 detects such a move, it sends a Routing Area Update Request message in Step 5. This message is received by the GERAN/UTRAN radio access network and forwarded to the SGSN 130. This message contains the UE's Packet Temporary Mobile Subscriber Identity mapped from the GUTI received in Step 3. This message also contains the UE's current and previous Routing Area Identities. Rather than obtaining the context used to serve the UE 110 from the UE 110 itself, the SGSN 130 obtains this information from the MME 118 by initiating a context exchange flow. This flow begins when the SGSN 130 requests the UE 110 context information from the MME 118 in Step 6. In Step 7, the MME 118 responds by sending a Context Response Message containing the requested context information and indicating that is it capable of operating in ISR mode.

For ISR to be continued in the event of an MME, SGSN or SGW change, information is exchanged during ISR activation beyond what is used to merely activate ISR. To support ISR continuation, the SGSN 130 learns MME's F-TEID towards SGW. Similarly, the MME 118 learns the SGSN's F-TEID towards SGW. In this way, if a new SGW is swapped in, either of the peers is able to send the new SGW the other peer's F-TEID towards SGW so that the new SGW can contact that other peer. Similarly, when peer MME and SGSN nodes are aware of each other's F-TEID towards SGW, they are able to update a newly swapped-in peer node. In Step 7, the MME 118 begins this exchange by sending a Context Response message to the SGSN 130 which contains the MME's F-TEID towards SGW. This message also indicates to the SGSN 130 that the MME 118 supports ISR.

In Step 8, the SGSN 130 initiates a bearer modification message flow with the SGW 120. The SGSN 130 begins this process by sending a Modify Bearer Request message to the SGW 120. This Modify Bearer Request message indicates that ISR has been established between the SGSN 130 and the MME 118. The SGW 120 responds by sending a Modify Bearer Response message in Step 9. This message indicates that the SGW 120 supports ISR. The bearers are modified by Steps 8 and 9 to support network traffic flowing from the UE 110 through the SGSN 130 to the SGW 120.

In Step 10, the SGSN 130 sends a Context Acknowledge message to the MME 118. This message contains the SGSN's F-TEID towards SGW, completing the exchange of F-TEIDs begun in Step 7. This message also indicates that ISR has been activated. In Step 11, the SGSN 130 and HSS 124 interact to update the HSS 124 on the location of the UE 110. In Step 12, the SGSN 130 responds to the UE 110 with a Routing Area Update Accept message containing the UE's new Packet Temporary Mobile Subscriber Identity. This message also indicates to the UE 110 that ISR is activated. The Routing Area Update procedure begun in Step 5 is complete.

Figure 3A:
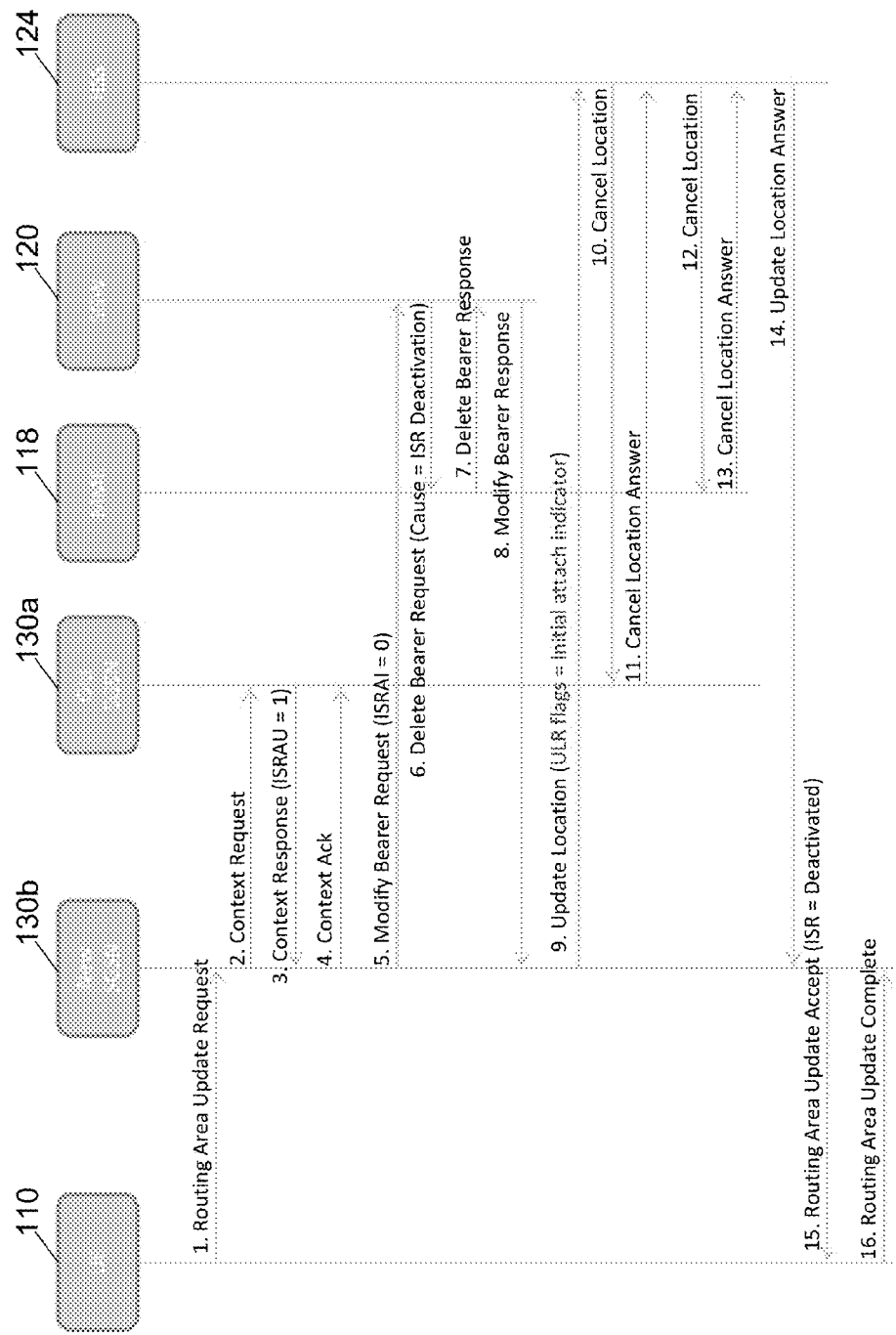
FIGS. 3A, 4A, 5A, 6A, 7A, and 8A are message diagrams illustrating idle mode signaling reduction deactivation.

FIG. 3A is a message diagram illustrating a network handover procedure resulting in the deactivation of ISR. FIG. 3A includes UE 110, an old SGSN 130a, a new SGSN 130b, an MME 118, an SGW 120, and an HSS 124. ISR has been activated between the UE 110, old SGSN 130a, the MME 118, and the SGW 120. This procedure occurs when the UE 110 has moved from an area served by a first GERAN/UTRAN base station into an area served by a second GERAN/UTRAN base station. An old SGSN 130a serves the first base station and a new SGSN 130b serves the second base station. In Step 1, the UE 110 sends a Routing Area Update Request message to the new SGSN 130b. A context exchange flow begins when the new SGSN 130b requests context information from the old SGSN 130a in Step 2. In Step 3, the old SGSN 130a responds with the requested context information in a Context Response message. This message indicates that ISR was activated for the UE 110 at the old SGSN 130a.

In Step 5, the new SGSN 130b selects the SGW 120 that was used by the old SGSN 130a to serve the UE 110. If the new SGSN 130b selected a different SGW then the procedure illustrated in FIG. 7A would occur instead of the procedure illustrated in FIG. 3A. Once the SGW 120 is selected, the new SGSN 130b begins a bearer modification message flow with the SGW 120. The new SGSN 130b begins this flow by sending the SGW 120 a Modify Bearer Request message. This message indicates that ISR is to be deactivated. In Step 6, the SGW 120 sends a Delete Bearer Request message to the MME 118. The MME 118 deletes its bearers because, upon ISR deactivation, it will no longer serve the UE 110 in parallel with the old SGSN 130a. If the MME 118 had any E-UTRAN Radio Access Bearers activated for the bearer being deleted, it sends a release command to the E-UTRAN and releases the E-UTRAN connection. When the last connection for the UE 110 is deactivated, the MME 118 implicitly detaches from the UE 110. The MME 118 responds with a Delete Bearer Response message in Step 7. In Step 8, the SGW 120 completes the bearer modification message flow by sending a Modify Bearer Response to the new SGSN 130b.

In Step 9, the new SGSN 130b begins a location update message flow by sending an Update Location message to the HSS 124. The HSS 124 is responsible for tracking the location of the UE 110 within the network and so is informed of the UE's new location. The HSS 124, once so informed, can update other nodes in the network with the UE's new location. The Update Location message indicates the UE's new location to the HSS 124. This message also includes an Update Location Request flag set to indicate that this message is sent in response to an Initial Attach. The HSS 124 accordingly informs the old SGSN 130a and the MME 118 to cancel their respective location records for the UE 110, as ISR will be deactivated. In Step 10, the HSS 124 informs the old SGSN 130a of this change in a Cancel Location message. The old SGSN 130a confirms that it has removed the UE 110 from its records in Step 11. In Step 12, the HSS 124 informs the MME 118 of this change in a Cancel Location message. The MME 118 confirms that it has removed the UE 110 from its records in Step 13. In Step 14, the HSS 124 completes the location update message flow by sending an Update Location Answer message to the new SGSN 130b confirming that the location was successfully updated on the HSS 124, the old SGSN 130a, and the MME 118.

In Step 15, the new SGSN 130b sends a Routing Area Update Accept message to the UE 110 indicating that UE's Routing Area Update Request has been accepted. This message also indicates that ISR has been deactivated. The UE 110 confirms that the Routing Area Update procedure is complete by sending a Routing Area Update Complete message to the new SGSN 130b in Step 16.

Figure 3B:
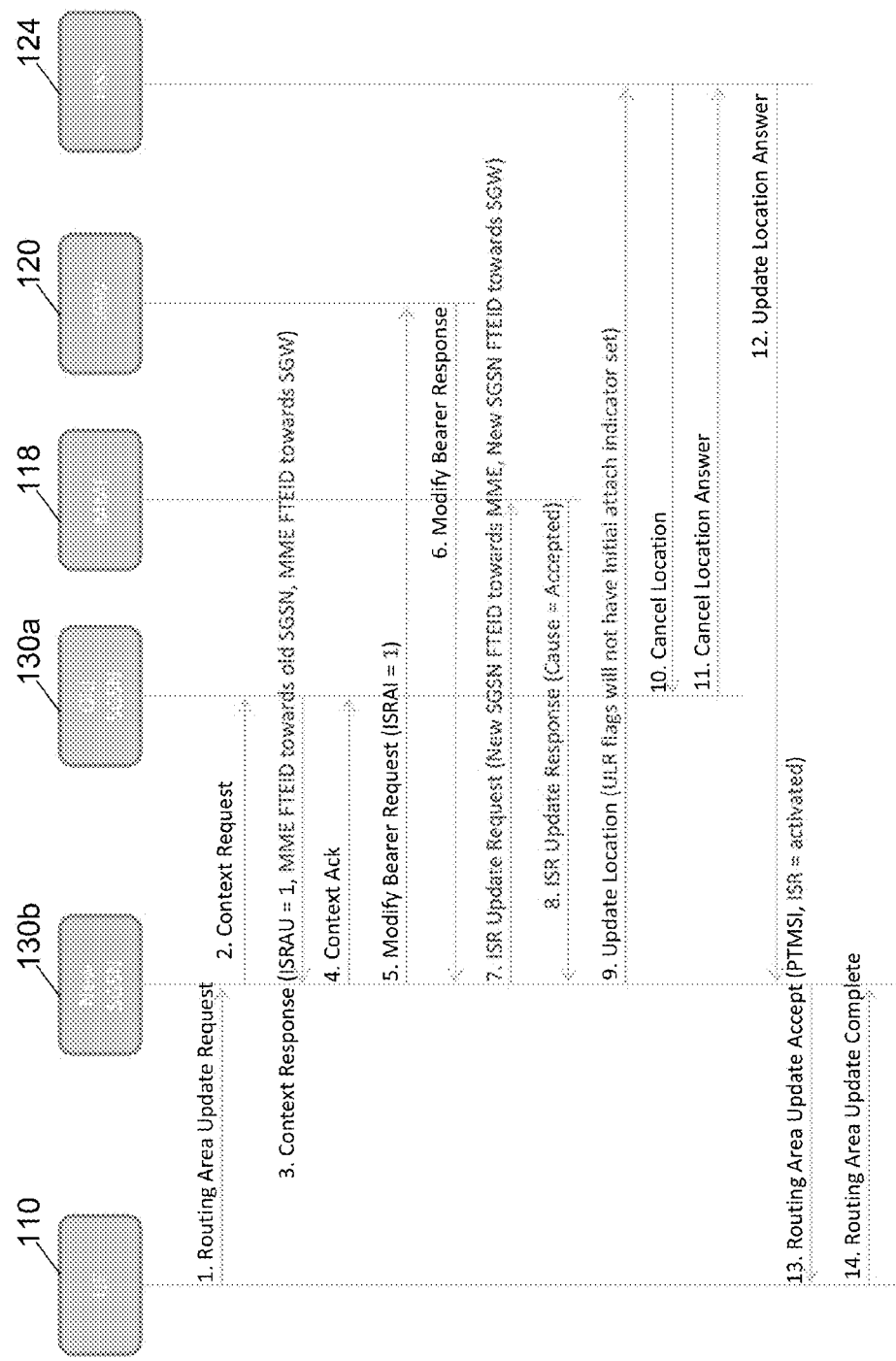
FIGS. 3B, 4B, 5B, 6B, 7B, and 8B are message diagrams illustrating idle mode signaling reduction continuation in accordance with some embodiments.

FIG. 3B is a message diagram illustrating a network handover procedure that continues ISR activation in accordance with some embodiments. FIG. 3B includes UE 110, an old SGSN 130a, a new SGSN 130b, an MME 118, an SGW 120, and an HSS 124. As with FIG. 3A, ISR has been activated between the UE 110, the old SGSN 130a, the MME 118, and the SGW 120. The UE 110 is registered with both the old SGSN 130a and the MME 118. Both the old SGSN 130a and MME 118 have control connections with the SGW 120. The old SGSN 130a, the new SGSN 130b, the MME 118, and the SGW 120 can support ISR continuation. ISR was activated on these nodes in accordance with the method illustrated in FIG. 2B.

In Step 1, the UE 110 has moved into a Routing Area served by the new SGSN 130b. The UE 110 detects this move and sends a Routing Area Update Request message to the new SGSN 130b. This message includes the Routing Area Identities corresponding to both the UE's current and previous Routing Area. In Step 2, the new SGSN 130b initiates a context exchange flow. This flow beings with the new SGSN 130b requesting context information from the old SGSN 130a by sending a Context Request message. The old SGSN 130a responds with a Context Response message in Step 3. Included in this message is the MME's F-TEID towards old SGSN and the MME's F-TEID towards SGW. An MME's F-TEID towards an SGSN includes the IP address of the MME and a tunnel endpoint identifier which identifies the tunnel as carrying data from an SGSN on behalf of a particular UE (e.g., that UE's context towards the SGSN). Similarly, as mentioned above, an MME's F-TEID towards SGW includes the IP address of the MME and a tunnel endpoint identifier that represents a connection on behalf of a particular UE from an SGW. This information is used by the new SGSN 130b to continue ISR activation. In particular, the MME's F-TEID towards old SGSN is used by the new SGSN 130b to communicate with the MME 118. The MME's F-TEID towards SGW is stored so that the new SGSN 130b can point a new SGW to the MME 118 if such a new SGW is later selected. A procedure where ISR is continued following such a selection of a new SGW is illustrated in FIG. 5B. In Step 4, the new SGSN 130b send a Context Acknowledge Message to the old SGSN 130a confirming the receipt of the message sent in Step 3.

Based on the Routing Area Identities included in the Routing Area Update Request message, the new SGSN 130b has selected the same SGW 120 that was previously serving the UE 110. In Step 5, the new SGSN 130b begins a bearer modification message flow with the SGW 120 by sending a Modify Bearer Request message. The new SGSN 130b sends the SGW 120 a Modify Bearer Request message. This message indicates that ISR mode is to be continued. On receipt of this message, the SGW 120 updates its tunnel information towards SGSN to use the new SGSN's F-TEID towards SGW. The SGW 120 no longer has connection information regarding the old SGSN 130a. At this point, the SGW 120 has parallel connections to both the MME 118 and the new SGSN 130b. ISR mode can continue with the new SGSN 130b responsible for GERAN/UTRAN communication with the UE 110 in place of the old SGSN 130a. In Step 6, the SGW 120 concludes the bearer modification message flow by sending a Modify Bearer Response message to the new SGSN 130b confirming that the tunnel information was updated correctly.

In Step 7, the new SGSN 130b begins an ISR update message flow. Through this flow, the new SGSN 130b establishes itself as a new ISR peer node with the MME 118, replacing the old SGSN 130a. The new SGSN 130b begins this process by sending the MME 118 an ISR Update Request message. This message includes the new SGSN's F-TEID towards MME and the new SGSN's F-TEID towards SGW. An SGSN's F-TEID towards an MME includes the IP address of the SGSN and a tunnel endpoint identifier which identifies the tunnel as carrying data from an MME on behalf of a particular UE (e.g., that UE's context towards the MME). Similarly, as mentioned above, an SGSN's F-TEID towards SGW includes the IP address of the SGSN and a tunnel endpoint identifier that represents a connection on behalf of a particular UE from an SGW. In Step 8, the MME 118 updates its control tunnel towards SGSN with the new SGSN's F-TEID towards MME. The MME 118 responds with an ISR Update Response message to conclude the ISR update message flow.

In Step 9, the new SGSN 130b begins a location update message flow, as in FIG. 3A, by sending an Update Location message to the HSS 124. In Step 10, the HSS 124 informs the old SGSN 130a of the UE's new location by sending a Cancel Location message to the old SGSN 130a. The old SGSN 130a confirms that it has removed the UE 110 from its records in Step 11. The Update Location message sent in Step 9 did not contain Update Location Request flags with an Initial Attach indicator set and so the HSS 124 does not transmit a Cancel Location message to the MME 118. In Step 12, the HSS 124 sends an Update Location Answer message to the new SGSN 130b confirming that the location was successfully updated on the HSS 124 and the old SGSN 130a.

In Step 13, the new SGSN 130b sends a Routing Area Update Accept message to the UE 110 indicating that UE's Routing Area Update Request has been accepted. This message also indicates that ISR remains activated. The UE 110 confirms that the Routing Area Update procedure is complete by sending a Routing Area Update Complete message to the new SGSN 130b in Step 14.

Figure 4A:
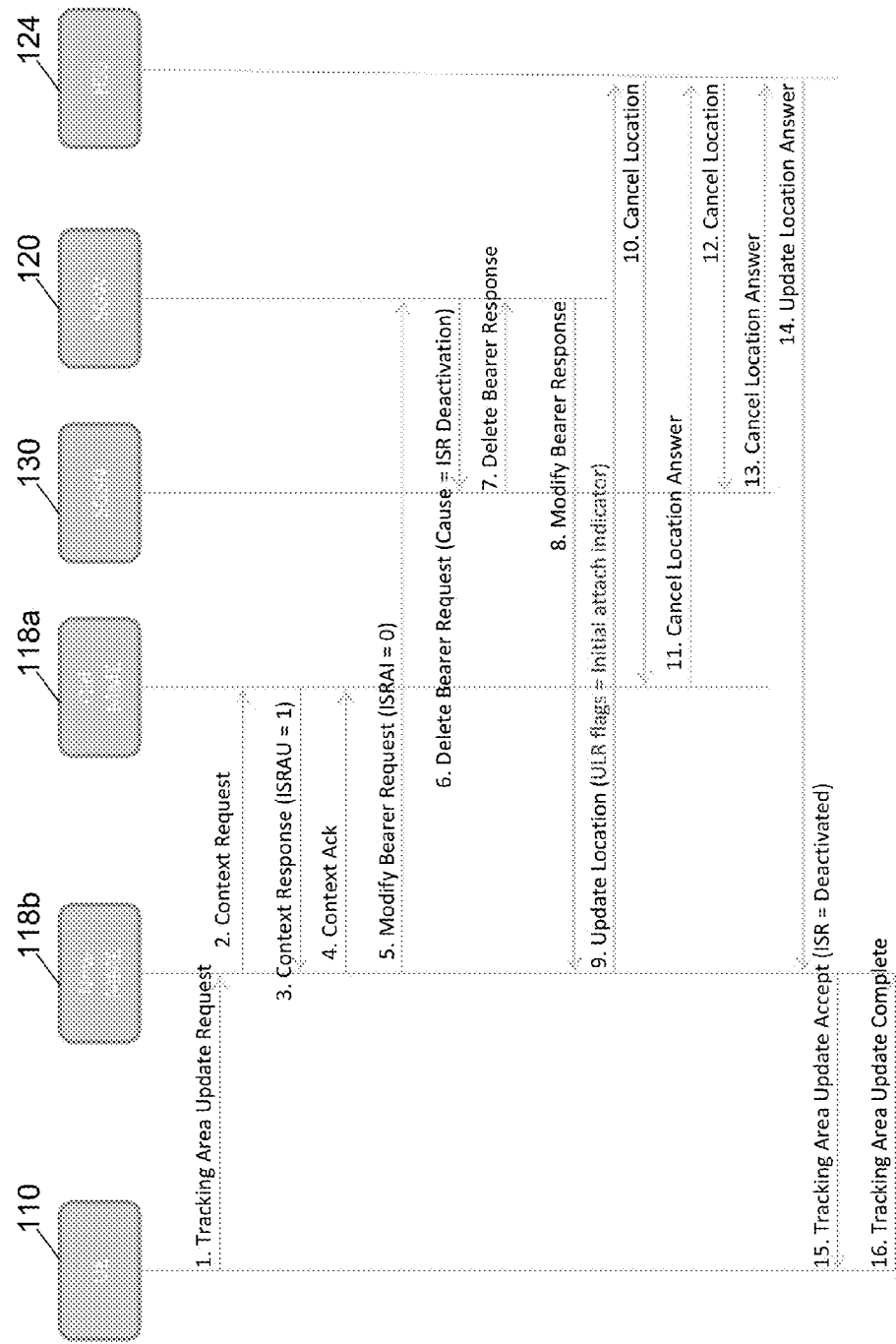

FIG. 4A is a message diagram illustrating a network handover procedure resulting in the deactivation of ISR. In particular, FIG. 4A illustrates a Tracking Area Update procedure that is very similar to the Routing Area Update procedure illustrated in FIG. 3A, except that a new MME is selected rather than a new SGSN. FIG. 4A includes UE 110, an old MME 118a, a new MME 118b, an SGSN 130, an SGW 120, and an HSS 124. ISR has been activated between the UE 110, the old MME 118a, the SGSN 130, and the SGW 120. This procedure can occur, for example, when the UE 110 has moved from a first Tracking Area to a second Tracking Area outside the list of tracking areas that was sent to the UE by the old MME 118a. In that case, the old MME 118a serves the first Tracking Area and the new MME 118b serves the second Tracking Area. In Step 1, the UE 110 sends a Tracking Area Update Request message to the new MME 118b. The new MME 118b initiates a context exchange message flow by sending a Context Request message to the old MME 118a in Step 2. In Step 3, the old MME 118a responds with the requested context information in a Context Response message. This message indicates that ISR was activated for the UE 110 at the old MME 118a.

In Step 5, the new MME 118b selects the SGW 120 that was used by the old MME 118a to serve the UE 110. Once selected, the new MME 118b initiates a bearer modification message flow with the SGW 120. The new MME 118b begins this flow by sending the SGW 120 a Modify Bearer Request message. This message indicates that ISR is to be deactivated. In Step 6, the SGW 120 sends a Delete Bearer Request message to the SGSN 130. The SGSN 130 deletes its bearers because, upon ISR deactivation, it will no longer serve the UE 110 in parallel with the old MME 118a. The SGSN 130 responds with a Delete Bearer Response message in Step 7. If the SGSN 130 was maintaining any connections for the bearer being deleted, then the SGSN 130 sends a release command to the network and terminates the connection. When the last connection for the subscriber is deactivated, the SGSN 130 implicitly detaches the UE 110. In Step 8, the SGW 120 sends a Modify Bearer Response to the new MME 118b, which completes the bearer modification message flow.

In Step 9, the new MME 118b begins a location update message flow by sending an Update Location message to the HSS 124. The Update Location message indicates the UE's new location to the HSS 124. This message also includes an Update Location Request flag set to indicate that this message is sent in response to an Initial Attach. The HSS 124 accordingly informs the old MME 118a and the SGSN 130 to cancel their respective location records for the UE 110, as ISR will be deactivated. In Step 10, the HSS 124 informs the old MME 118a of this change in a Cancel Location message. The old MME 118a confirms that it has removed the UE 110 from its records by sending a Cancel Location Answer message in Step 11. The Update Location message sent in Step 9 did not contain Update Location Request flags with an Initial Attach indicator set and so the HSS 124 does not transmit a Cancel Location message to the SGSN 130. In Step 12, the HSS 124 informs the SGSN 130 of this change in a Cancel Location message. The SGSN 130 confirms that it has removed the UE 110 from its records by sending a Cancel Location Answer message in Step 13. In Step 14, the HSS 124 sends an Update Location Answer message to the new MME 118*b* confirming that the location was successfully updated on the HSS 124, the old MME 118*a*, and the SGSN 130. This completes the location update message flow.

In Step 15, the new MME 118*b* sends a Tracking Area Update Accept message to the UE 110 indicating that UE's Tracking Area Update Request has been accepted. This message also indicates that ISR has been deactivated. The UE 110 confirms that the Tracking Area Update procedure is complete by sending a Tracking Area Update Complete message to the new MME 118*b* in Step 16.

Figure 4B:
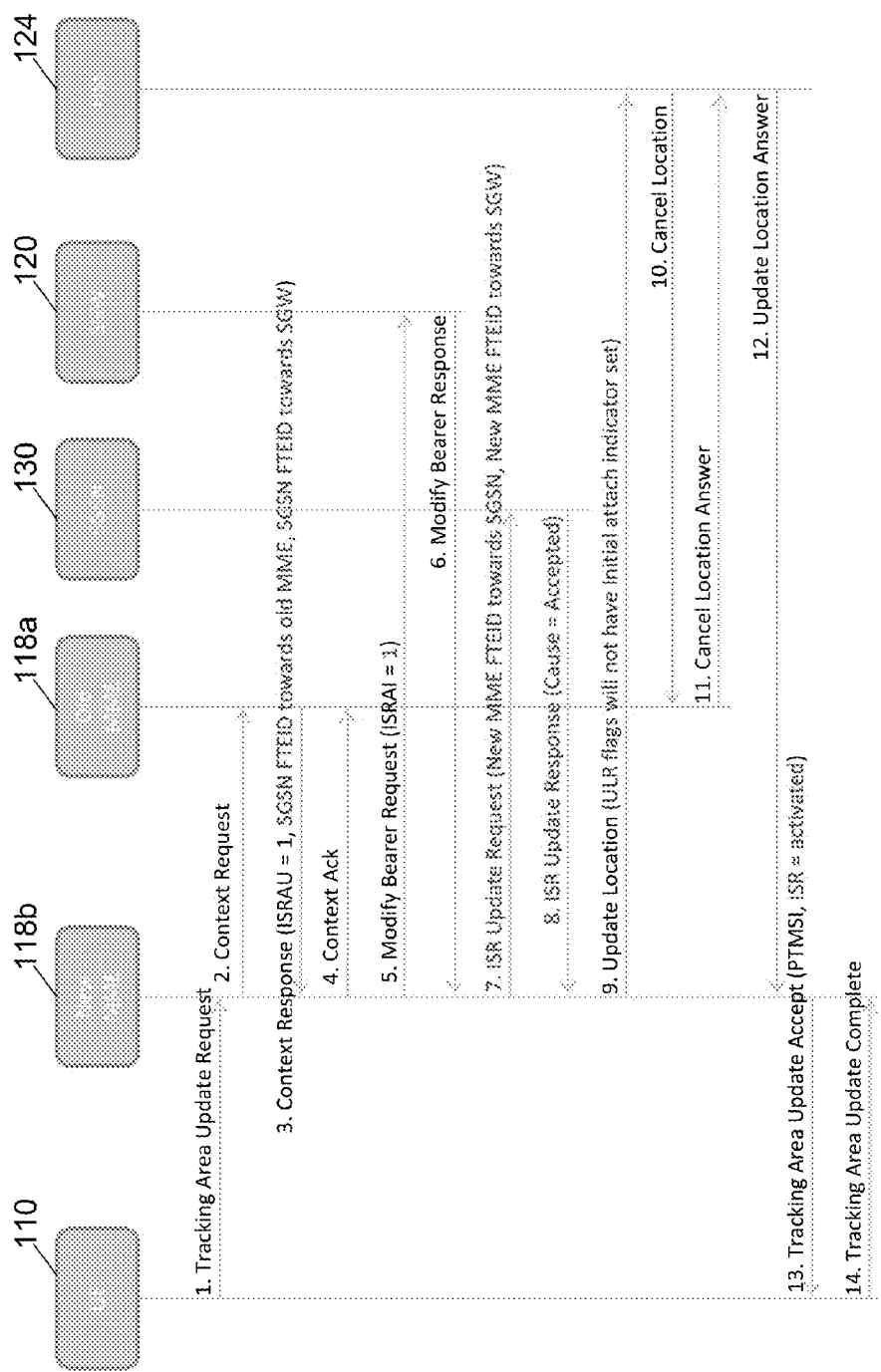

FIG. 4B is a message diagram illustrating a network handover procedure that continues ISR activation in accordance with some embodiments. FIG. 4B includes UE 110, an old MME 118*a*, a new MME 118*b*, an SGSN 130, an SGW 120, and an HSS 124. As with FIG. 4A, ISR has been activated between the UE 110, the old MME 118*a*, the SGSN 130, and the SGW 120. The UE 110 is registered with both the old MME 118*a* and the SGSN 130. In turn, both the old MME 118*a* and the SGSN 130 have control connections with the SGW 120. The old MME 118*a*, the new MME 118*b*, the SGSN 130, and the SGW 120 can support ISR continuation.

In Step 1, the UE 110 has moved into a Tracking Area served by the new MME 118*b*. The UE 110 detects this move and sends a Tracking Area Update Request message to the new MME 118*b*. In Step 2, the new MME 118*b* requests context information from the old MME 118*a* by sending a Context Request message. This request is made so that the new MME 118*b* can serve the UE 110 without running a new attach procedure with the UE 110. The old MME 118*a* responds with a Context Response message in Step 3. Included in this message is the SGSN's F-TEID towards old MME and the SGSN's F-TEID towards SGW. This information is used by the new MME 118*b* to continue ISR activation in place of the old MME 118*a*. The SGSN's F-TEID towards old MME is used by the new MME 118*b* to communicate with the SGSN 130. The SGSN's F-TEID towards SGW is stored so that the new MME 118*b* can point a new SGW to the SGSN 130 if such a new SGW is later selected. A process of this nature is illustrated in FIG. 6B. In Step 4, the new MME 118*b* sends a Context Acknowledge Message to the old MME 118*a* confirming the receipt of the message sent in Step 3.

Based on the Tracking Area Identities included in the Tracking Area Update Request message, the new MME 118*b* has selected the same SGW 120 that was previously serving the UE 110. In Step 5, the new MME 118*b* initiates a bearer modification message flow by sending a Modify Bearer Request message to the SGW 120. The new MME 118*b* sends the SGW 120 a Modify Bearer Request message. This message indicates that ISR mode is to be continued. On receipt of this message, the SGW 120 updates its tunnel information towards MME to use the new MME's F-TEID towards SGW. The SGW 120 no longer has connection information regarding the old MME 118*a*. At this point, the SGW 120 has parallel connections to both the SGSN 130 and the new MME 118*b*. ISR mode can continue with the new MME 118*b* responsible for E-UTRAN communication with the UE 110 in place of the old MME 118*a*. In Step 6, the SGW 120 sends a Modify Bearer Response message to the new MME 118*b* confirming that the tunnel information was updated correctly. This completes the bearer modification message flow begun in Step 5.

In Step 7, the new MME 118*b* initiates an ISR update message flow. The new MME 118*b* establishes itself as a new peer node with the SGSN 130, replacing the old MME 118*a*. The new MME 118*b* begins this flow by sending the SGSN 130 an ISR Update Request message. This message includes the new MME's F-TEID towards SGSN and the new MME's F-TEID towards SGW. In Step 8, the SGSN 130 updates its control tunnel towards MME with the new MME's F-TEID towards MME and responds with an ISR Update Response message.

In Step 9, the new MME 118*b* initiates a location update message flow as in FIG. 4A by sending an Update Location message to the HSS 124. In Step 10, the HSS 124 informs the old MME 118*a* of this change in a Cancel Location message. The old MME 118*a* confirms that it has removed the UE 110 from its records in Step 11. In Step 12, the HSS 124 sends an Update Location Answer message to the new MME 118*b* confirming that the location was successfully updated on the HSS 124 and the old MME 118*a*.

In Step 13, the new MME 118*b* sends a Tracking Area Update Accept message to the UE 110 indicating that UE's Tracking Area Update Request has been accepted. This message also indicates that ISR remains activated. The UE 110 confirms that the Tracking Area update procedure is complete by sending a Tracking Area Update Complete message to the new MME 118*b* in Step 14. The Tracking Area Update procedure is complete.

Figure 5A:
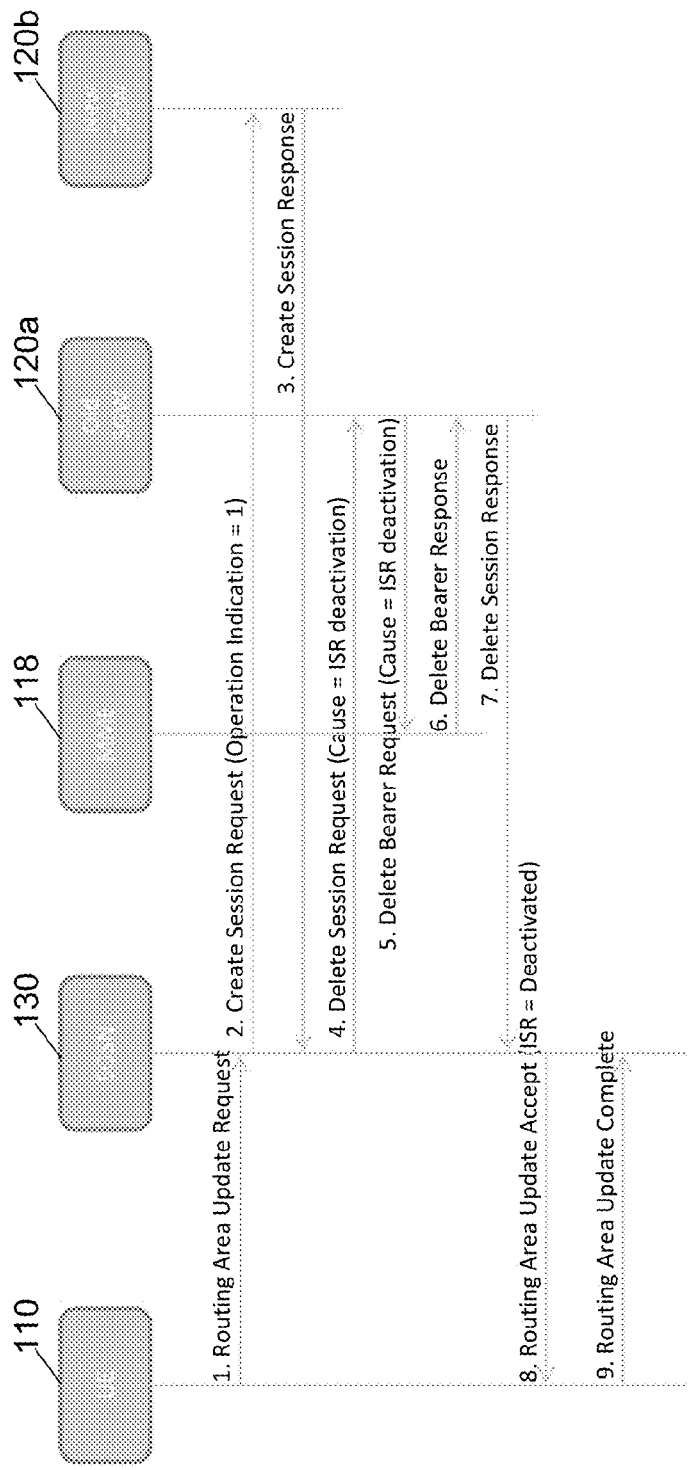
Figure 5B:
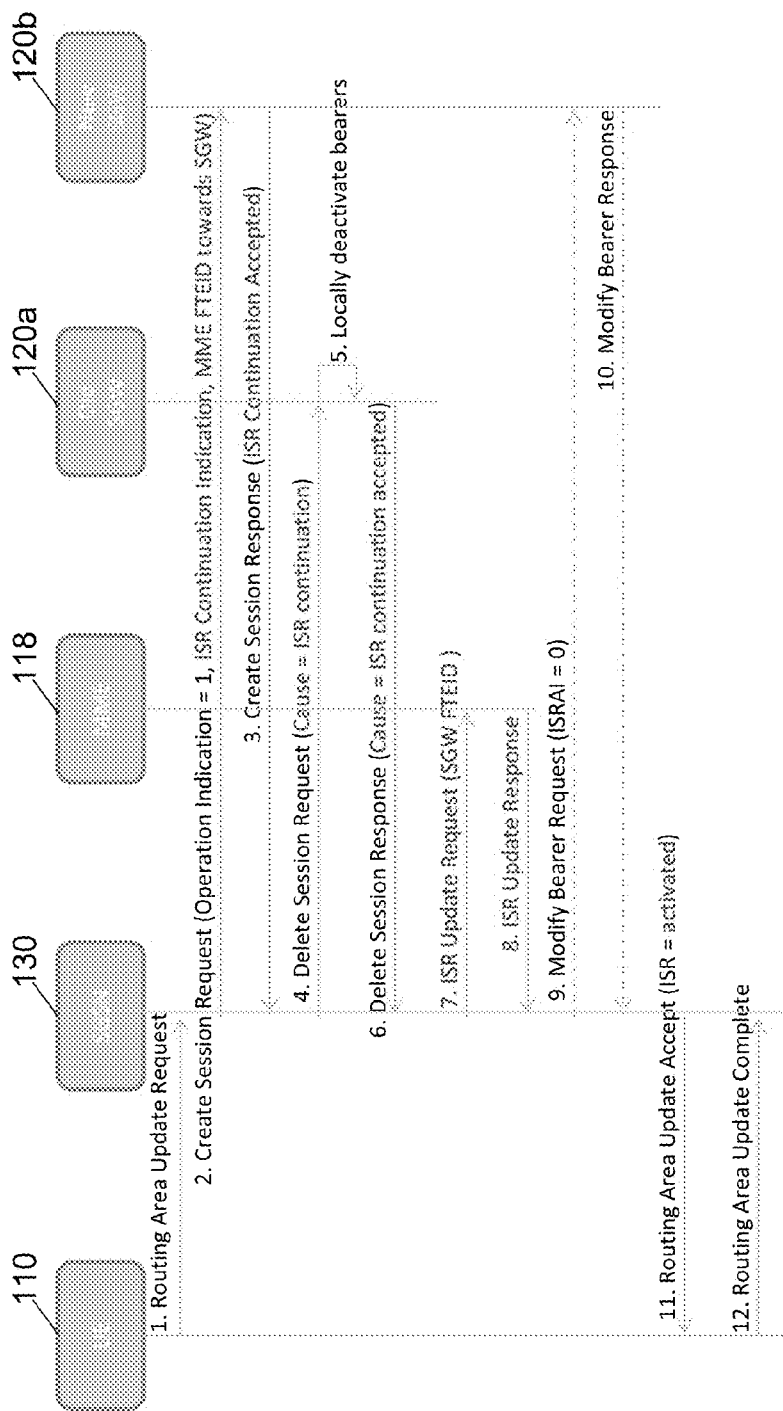

FIG. 5A is a message diagram illustrating a network handover procedure resulting in the deactivation of ISR. FIG. 5A includes UE 110, an SGSN 130, an MME 118, an old SGW 120*a*, and a new SGW 120*b*. This sequence occurs when an intra-SGSN Routing Area update causes the SGSN 130 to select a new SGW 120*b*. This may occur when the UE 110 moves to a new Routing Area served by the same SGSN 130 as the UE's previous Routing Area.

In Step 1, the UE 110 sends a Routing Area Update Request message to the SGSN 130. This message contains a new Routing Area Identity corresponding to the UE's new Routing Area. The SGSN 130 selects a new SGW 120*b* to serve the UE 110 based on the new Routing Area Identity and sends a Create Session Request message to the new SGW 120*b* in Step 2. The SGSN 130 establishes a control tunnel with the new SGW 120*b*. The Operation Indication bit of this message is set to indicate that the message is sent due to an SGW switch. As a result, the new SGW 120*b* indicates to the PGW that the bearers for the UE 110 are to be routed through the new SGW 120*b*. In Step 3, the new SGW 120*b* sends a Create Session Response message to the SGSN 130 indicating that the bearers were correctly modified.

In Step 4, the SGSN 130 sends a Delete Session Request message to the old SGW 120*a*. The old SGW 120*a* responds by closing its existing control tunnel with the SGSN 130. This message indicates that ISR is to be deactivated. As ISR is deactivated, the old SGW 120*a* also informs the MME 118 to deactivate its bearers for the UE 110. The old SGW 120*a* does so by sending a Delete Bearer Request message to the MME 118 in Step 5. In Step 6, the MME 118 locally deactivates its bearers for the UE 110. When the last connection for the UE 110 is deactivated at the MME 118, the UE 110 is implicitly detached from the MME 118. The MME 118 sends a Delete Bearer Response message confirming this deactivation to the old SGW 120*a*.

In Step 7, the old SGW 120*a* sends a Delete Session Response message to the SGSN 130 in response to the message sent in Step 4. In Step 8, the SGSN 130 sends a Routing Area Update Accept message to the UE 110. This message indicates that ISR has been deactivated. The UE 110 deactivates ISR and sets its "Temporary Identity used in Next update" field equal to Packet Temporary Mobile Subscriber Identity. The UE 110 confirms receipt by sending a Routing Area Update Complete message to the SGSN 130 in Step 9.

FIG. 5B is a message diagram illustrating a network handover procedure that continues ISR activation in accordance with some embodiments. FIG. 5B includes UE 110, an SGSN 130, an MME 118, an old SGW 120*a*, and a new SGW 120*b*. ISR is activated and the UE 110 is registered with both the SGSN 130 and the MME 118. As in FIG. 5A, the UE 110 moves into a new Routing Area that is served by the same SGSN as the UE's previous Routing Area. The SGSN 130 selects the new SGW 120*b*. The SGSN 130, the MME 118, the old SGW 120*a* and the new SGW 120*b* can support ISR continuation.

The UE 110 sends a Routing Area Update Request message to the SGSN 130 in Step 1. This message contains the Routing Area Identity of the UE 110. Based on the mappings stored by the SGSN 130, this Routing Area Identity results in the selection of the new SGW 120*b* to serve the UE 110. The SGSN 130 also creates a control tunnel for the UE 110 towards the new SGW 120*b*. The SGSN 130 sends a Create Session Request message to the new SGW 120*b* in Step 2. This message contains an indication that this session being created due to SGW reselection. This message also indicates that ISR is to be continued. To facilitate ISR continuation, the SGSN 130 includes the MME's F-TEID towards SGW in the message. This F-TEID allows the new SGW 120*b* to open a control tunnel towards the MME 118.

The new SGW 120*b* responds to the SGSN 130 with a Create Session Response message in Step 3. As the new SGW 120*b* supports ISR Continuation, this message indicates that ISR continuation is accepted. If the new SGW 120*b* did not support ISR continuation then it would proceed with the sequence illustrated in FIG. 5A, starting with Step 3, and ISR would not be continued. In Step 4, the SGSN 130 sends a Delete Session Request message to the old SGW 120*a*. This message indicates that the SGSN's session with the old SGW 120*a* is to be deleted but that ISR is to continue. Based on this indication, the old SGW 120*a* does not communicate with the MME 118 to deactivate the MME's bearers as illustrated in FIG. 5A. Rather, the old SGW 120*a* merely deactivates its bearers for the UE 110 locally. The old SGW 120*a* responds to the SGSN 130 with a Delete Session Response message in Step 6. This message indicates that ISR continuation has been accepted.

If the old SGW 120*a* did not support ISR continuation, or if ISR continuation was locally disabled at the old SGW 120*a*, the Delete Session Response message sent in Step 6 would not indicate that ISR continuation was accepted. In this case, the old SGW 120*a* would send a Delete Bearer Request message to the MME 118 as in Step 5 of FIG. 5A. Following this, the SGSN 130 would perform Steps 9 and 10 rather than Steps 7 and 8. In Step 9, the SGSN 130 sends a Modify Bearer Request message to the new SGW 120*b*. This message indicates that the ISR continuation commenced in Step 2 is to be stopped. The new SGW 120*b* confirms that it has stopped ISR continuation in Step 10.

If the old SGW 120*a* does support ISR continuation and so indicated in Step 6, the procedure moves to Step 7. In Step 7, the SGSN 130 initiates an ISR update message flow with the MME 118. The SGSN 130 sends an ISR Update Request message to the MME 118, informing it of the change in SGW. This message contains the SGW's F-TEID. The MME 118 uses the F-TEID included in the message to update its SGW control tunnel to point to the new SGW 120*b*, rather than the old SGW 120*a*. If the MME 118 has any active E-UTRAN Radio Access Bearers for the UE 110 it sends a release command to the E-UTRAN and locally releases any active connections. In Step 8, the MME 118 sends an ISR Update Response message to the SGSN 130 indicating that the control tunnel was properly updated. As described above, Steps 9 and 10 are unnecessary in the case of the old SGW 120*a* supporting ISR continuation.

In Step 11, the SGSN 130 sends a Routing Area Update Accept message to the UE 110. If all of the access nodes supported ISR continuation (and so Steps 7 and 8 were run), the message indicates that ISR remains active. If any of the access nodes did not support ISR continuation the message indicates that ISR is deactivated. The UE 110 confirms receipt by sending a Routing Area Update Complete message to the SGSN 130 in Step 12.

Figure 6A:
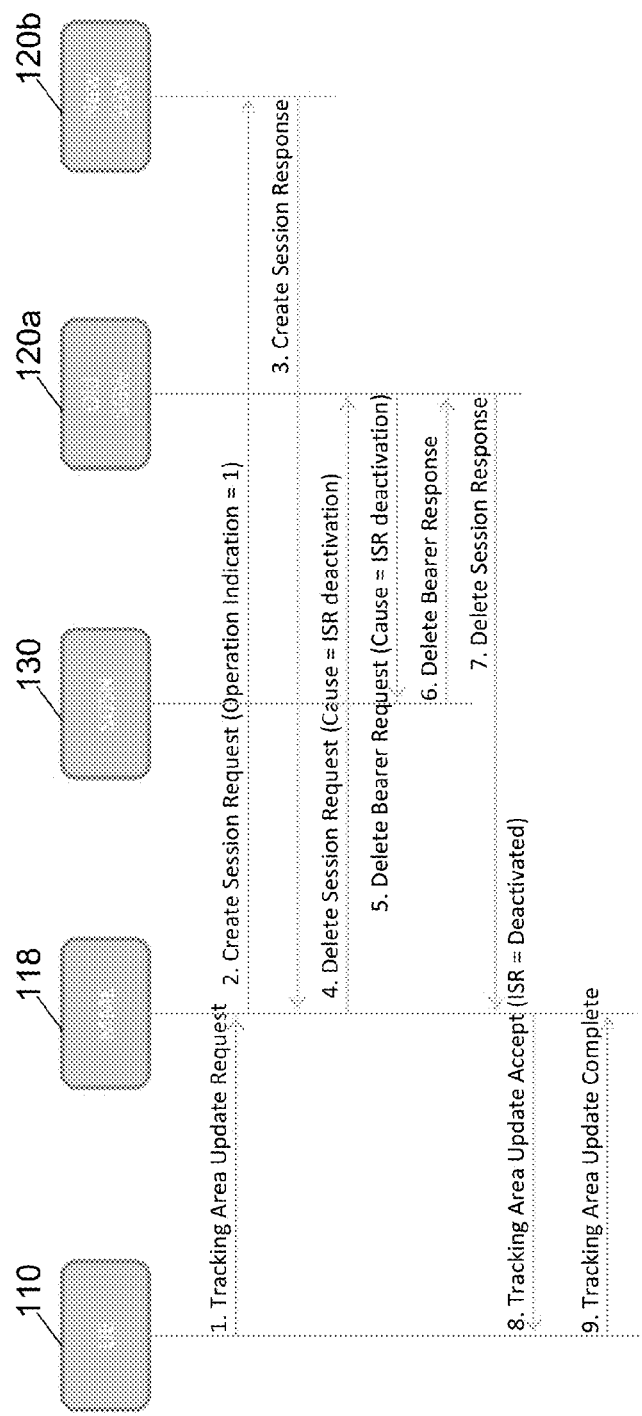
Figure 6B:
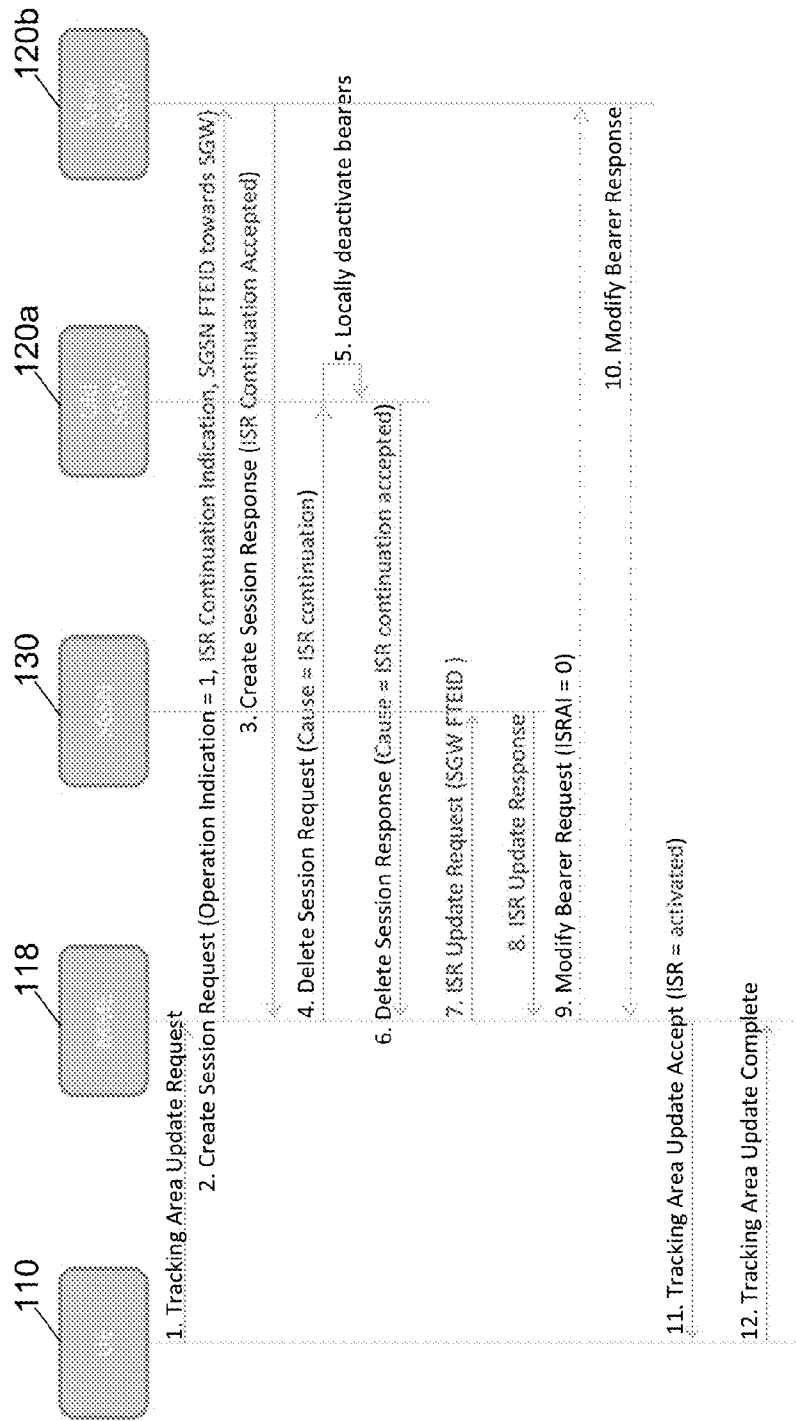

FIG. 6A is a message diagram illustrating a network handover procedure resulting in the deactivation of ISR. FIG. 6A includes UE 110, an MME 118, an SGSN 130, an old SGW 120*a*, and a new SGW 120*b*. This sequence occurs when an intra-MME Tracking Area update causes the new SGW 120*b* to be selected. As in FIG. 5A, ISR is activated between the UE 110, the MME 118, the SGSN 130 and the old SGW 120*a*. In Step 1, the UE 110 sends a Tracking Area Update Request message to the MME 118. The MME 118 selects the new SGW 120*b* to serve the UE 110 based on the Tracking Area Identities contained in the Tracking Area Update Request message and sends a Create Session Request message to the new SGW 120*b* in Step 2. The MME 118 establishes a control tunnel with the new SGW 120*b*. The Operation Indication bit of the Create Session Request message is set to indicate that the message is sent due to an SGW switch. Accordingly, the new SGW 120*b* indicates to the PGW that the bearers for the UE 110 are now to be routed through the new SGW 120*b*. In Step 3, the new SGW 120*b* sends a Create Session Response message to the MME 118 indicating that the bearers were correctly modified.

In Step 4, the MME 118 sends a Delete Session Request message to the old SGW 120*a*. The old SGW 120*a* responds by closing its existing control tunnel with the MME 118. This message indicates that the reason the session being deleted is because ISR is being deactivated. As ISR is being deactivated, the old SGW 120*a* also informs the SGSN 130 to deactivate its bearers for the UE 110. The old SGW 120*a* does so by sending a Delete Bearer Request message to the SGSN 130 in Step 5. In Step 6, the SGSN 130 locally deactivates its bearers for the UE 110. The SGSN 130 also sends a Delete Bearer Response message confirming this deactivation to the old SGW 120*a*. In Step 7, the old SGW 120*a* sends a Delete Session Response message to the MME 118.

In Step 8, the MME 118 sends a Tracking Area Update Accept message to the UE 110. This message indicates that ISR has been deactivated. The UE 110 deactivates ISR and sets its "Temporary Identity used in Next update" field equal to GUTI. The UE 110 confirms receipt by sending a Tracking Area Update Complete message to the MME 118 in Step 9. The Tracking Area Update procedure begun in Step 1 is complete and ISR is deactivated.

FIG. 6B is a message diagram illustrating a network handover procedure that continues ISR activation in accordance with some embodiments. FIG. 6B includes UE 110, an MME 118, an SGSN 130, an old SGW 120*a*, and a new SGW 120*b*. As in FIG. 6A, this sequence occurs when an intra-MME Tracking Area update causes a new SGW to be selected. ISR is activated between the UE 110, the MME 118, the SGSN 130, and the old SGW 120*a*. As in FIG. 5B, the MME 118, the SGSN 130, the old SGW 120*a* and the new SGW 120*b* can support ISR continuation. The UE 110 is moved into a new Tracking Area that is served by the same MME 118.

The UE 110 sends a Tracking Area Update Request message to the MME 118 in Step 1. This message contains the Tracking Area Identities of the UE 110. Based on the mapping stored by the MME 118, these Tracking Area Identities result in the selection of a new SGW 120b. The MME 118 creates a control tunnel for the UE 110 towards the new SGW 120b. The MME 118 sends a Create Session Request message to the new SGW 120b in Step 2. This message contains an indication that this session is being created due to SGW reselection. This message also indicates that ISR is to be continued. To facilitate ISR continuation, the MME 118 includes the SGSN's F-TEID towards SGW in the message. This F-TEID allows the new SGW to open a control tunnel towards the SGSN.

The new SGW 120b responds to the MME 118 with a Create Session Response message in Step 3. As the new SGW 120b supports ISR Continuation, this message indicates that ISR continuation is accepted. If the new SGW 120b did not support ISR continuation then it would proceed with the sequence illustrated in FIG. 6A, starting with Step 3. In Step 4, the MME 118 sends a Delete Session Request message to the old SGW 120a. This message indicates that the session is to be deleted due to ISR continuation. Based on this indication, the old SGW 120a does not instruct the SGSN 130 to deactivate the SGSN's bearers, as is illustrated in FIG. 6A. Rather, the old SGW 120a merely deactivates its bearers for the UE 110 locally, as is illustrated in FIG. 5B. The old SGW 120a responds to the MME 118 with a Delete Session Response message in Step 6. This message indicates that ISR continuation has been accepted.

If the old SGW 120a did not support ISR continuation, or if ISR continuation was locally disabled at the old SGW 120a, the Delete Session Response message sent in Step 6 would not indicate that ISR continuation was accepted. In this case, the old SGW 120a would send a Delete Bearer Request message to the SGSN 130 as in Step 5 of FIG. 6A. Furthermore, the MME 118 would perform Steps 9 and 10 instead of Steps 7 and 8. In Step 9, the MME 118 sends a Modify Bearer Request message to the new SGW 120b. This message indicates that the ISR continuation commenced in Step 2 is to be stopped. The new SGW 120b confirms that it has stopped ISR continuation in Step 10.

If the old SGW 120a does support ISR continuation and so indicated in Step 6, the procedure moves to Step 7. In Step 7, the MME 118 sends an ISR Update Request message to the SGSN 130, informing it of the change in SGW. This message contains the SGW's F-TEID. The SGSN 130 uses the F-TEID included in the message to update its SGW control connection to define a control tunnel towards the new SGW 120b rather than the old SGW 120a. In Step 8, the SGSN 130 sends an ISR Update Response message to the MME 118 indicating that the control tunnel was properly updated. As described above, Steps 9 and 10 are unnecessary in the case that the old SGW 120a does support ISR continuation.

In Step 11, the MME 118 sends a Tracking Area Update Accept message to the UE 110. If all of the access nodes supported ISR continuation (and so Steps 7 and 8 were run rather than Steps 9 and 10), the message indicates that ISR remains active. If any of the access nodes did not support ISR continuation the message indicates that ISR is deactivated. The UE 110 confirms receipt by sending a Tracking Area Update Complete message to the MME 118 in Step 12.

Figure 7A:
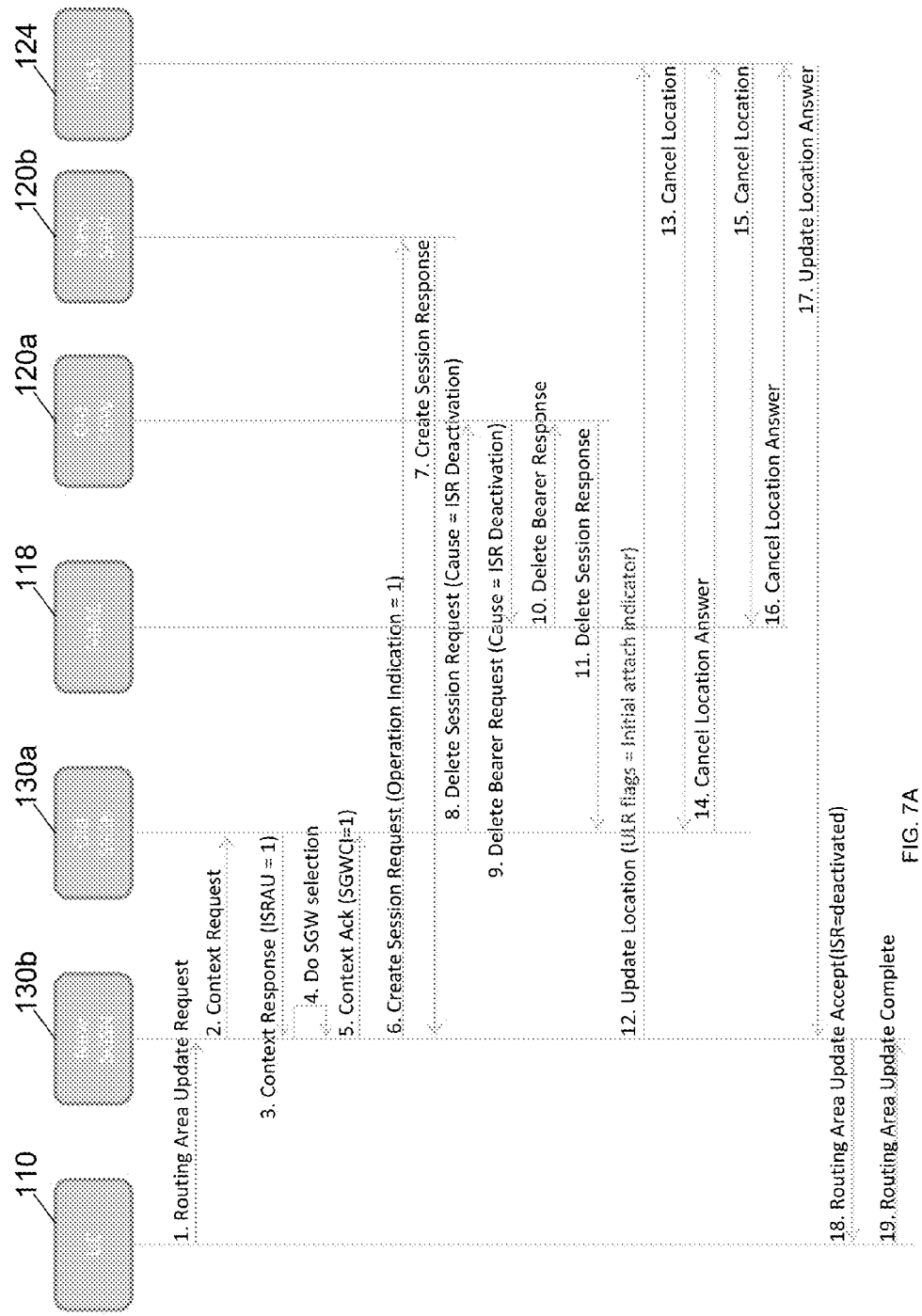

FIG. 7A is a message diagram illustrating a network handover procedure resulting in the deactivation of ISR. FIG. 7A includes UE 110, an old SGSN 130a, a new SGSN 130b, an MME 118, an old SGW 120a, a new SGW 120b, and an HSS 124. At the beginning of the procedure ISR is active on the UE 110, the old SGSN 130a, the MME 118, and the old SGW 120a. Both the old SGSN 130a and the MME 118 have control tunnels to the old SGW 120a. The UE 110 has been authenticated with the HSS 124, which is aware of the UE's location. The UE 110 has been moved to a new routing served by the new SGSN 130b. The UE 110, upon detecting this new Routing Area, sends a Routing Area Update Request message to the new SGSN 130b in Step 1. This message contains Routing Area Identities corresponding to both the UE's previous Routing Area and current Routing Area.

Using the Routing Area Identity corresponding to the UE's previous Routing Area received in Step 1, the new SGSN 130b performs a DNS lookup to contact the old SGSN 130a in Step 2. The new SGSN 130b sends the old SGSN 130a a Context Request message. The context being requested contains the UE's mobility management context as described earlier. In Step 3, the old SGSN 130a responds with the requested context by sending a Context Response message in Step 3. This message also indicates that ISR was active for the UE 110 at the old SGSN 130a.

In Step 4, the new SGSN 130b selects the new SGW 120b based on this Routing Area Identity corresponding to the UE's current Routing Area received in Step 1. In Step 5, the new SGSN 130b sends a Context Acknowledgement message to the old SGSN 130a. This message indicates that a new SGW 120b has been selected. In Step 6, the new SGSN 130b initiates the creation of a tunnel for the UE 110 with the new SGW 120b. The new SGSN 130b does so by sending the new SGW 120b a Create Session Request message. This message indicates that the reason for this new tunnel is that a new SGW has been selected and so the request is not to be forwarded to a PGW (as a session has already been established with a PGW). Instead, the new SGW 120b sends a Modify Bearer Request message to the PGW instructing the PGW to direct the UE's EPS bearer tunnel towards the new SGW 120b. The new SGW 120b responds with a Create Session Response message in Step 7.

In Step 8, the old SGSN 130a sends a Delete Session Request message to the old SGW 120a. This message indicates that ISR is to be deactivated. In response, the old SGW 120a deletes its bearers locally and sends a Delete Bearer Request message to the MME 118 in Step 9. This message also indicates that ISR is to be deactivated. In Step 10, the MME 118 locally deactivates its bearers. If the MME 118 has any active E-UTRAN Radio Access Bearers for the bearer, it sends a release command through the E-UTRAN to release corresponding connections. If the MME 118 is receiving the request for the last connection for the UE 110, it performs an implicit detach from that UE 110. The MME 118 sends a Delete Bearer response to the old SGW 120a for each bearer that is deactivated. In Step 11, the old SGW 120a sends a Delete Session Response message to the old SGSN 130a confirming that the bearers were properly deactivated.

In Step 12, the new SGSN 130b begins a location update message flow by sending an Update Location message to the HSS 124. This message includes an Update Location Request flag set to indicate that this message is sent in response to an Initial Attach. The HSS 124 accordingly informs the old SGSN 130a and the MME 118 to cancel their respective location records for the UE 110, as ISR will be deactivated. In Step 13, the HSS 124 informs the old SGSN 130a of this change in a Cancel Location message. The old SGSN 130a confirms that it has removed the UE 110 from its records in Step 14 by sending a Cancel Location Answer message. In Step 15, the HSS 124 informs the MME 118 of this change in a Cancel Location message. The MME 118 confirms that it has removed the UE 110 from its records in Step 16 by sending a Cancel Location Answer message. In Step 17, the HSS 124 sends an Update Location Answer message to the new SGSN 130b confirming that the location was successfully updated on the HSS 124, the old SGSN 130a and the MME 118.

In Step 18, the new SGSN 130b sends a Routing Area Update Accept message to the UE 110. This message indicates that ISR has been deactivated. The UE 110 sets its "Temporary Identity used in Next update" field equal to Packet Temporary Mobile Subscriber Identity. The UE 110 confirms receipt by sending a Routing Area Update Complete message to the new SGSN 130b in Step 19.

Figure 7B:
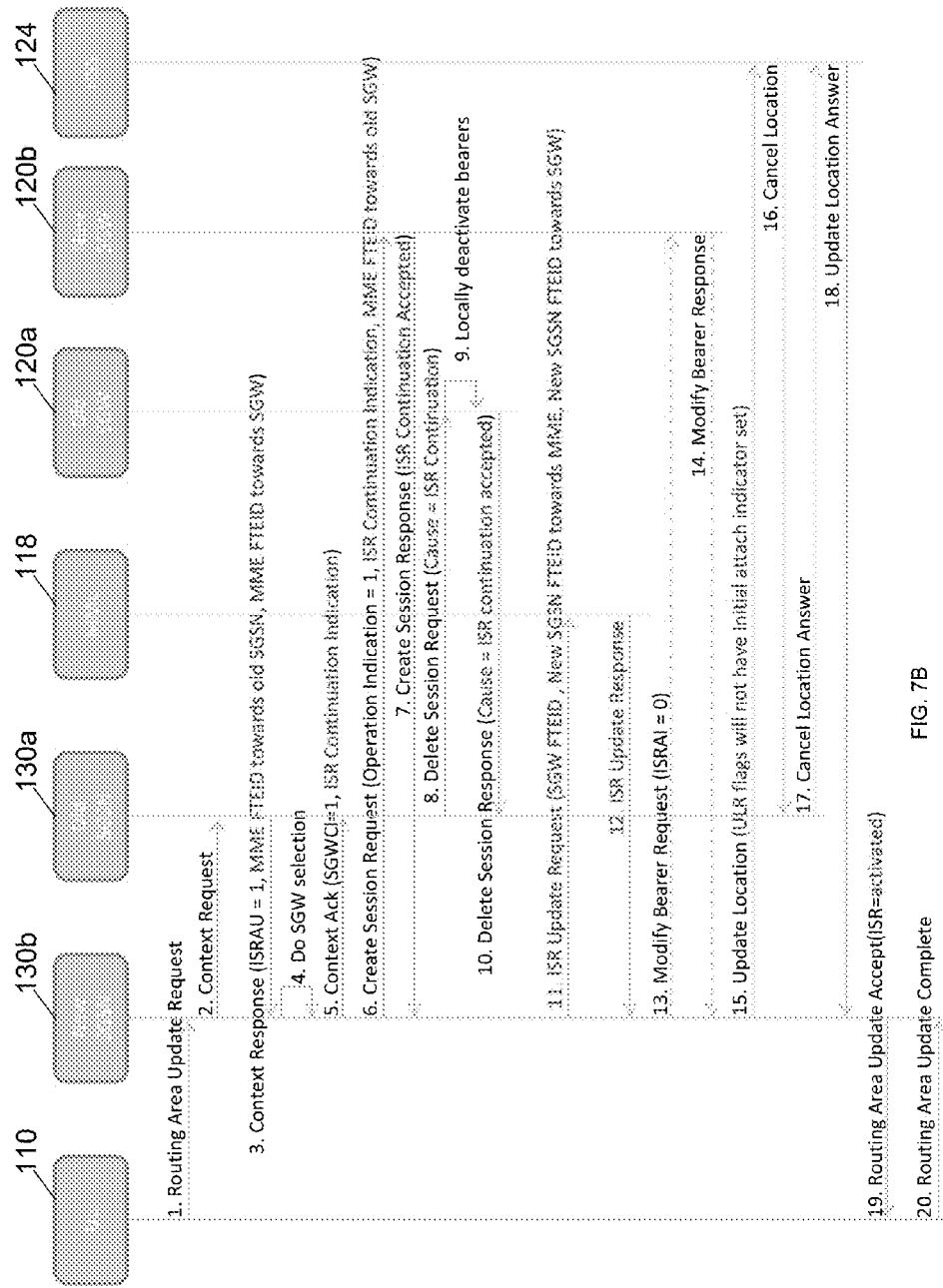

FIG. 7B is a message diagram illustrating a network handover procedure that continues ISR activation in accordance with some embodiments. FIG. 7B includes UE 110, an old SGSN 130a, a new SGSN 130b, an MME 118, an old SGW 120a, a new SGW 120b, and an HSS 124. At the beginning of the sequence ISR is active on the UE 110, the old SGSN 130a, the MME 118 and the old SGW 120a. The old SGSN 130a, the MME 118, and the old SGW 120a nodes can support ISR continuation. Both the old SGSN 130a and the MME 118 have control tunnels to the old SGW 120a. The UE 110 has been authenticated with the HSS 124, which is aware of the UE's location. The UE 110 has been moved to a new routing served by the new SGSN 130b. The UE 110, upon detecting this new Routing Area, sends a Routing Area Update Request message to the new SGSN 130b in Step 1. This message contains Routing Area Identities corresponding to both the UE's previous Routing Area and current Routing Area.

Using the Routing Area Identity corresponding to the UE's previous Routing Area received in Step 1, the new SGSN 130b performs a DNS lookup to contact the old SGSN 130a in Step 2. The new SGSN 130b sends the old SGSN 130a a Context Request message. The context being requested contains the UE's mobility management context. In Step 3, the old SGSN 130a sends a Context Response message to the new SGSN 130b with the requested information. This response also indicates to the new SGSN 130b that ISR was active for the UE at the old SGSN 130a. The context response additionally includes the MME's F-TEID towards old SGSN and the MME's F-TEID towards old SGW. In Step 4, the new SGSN 130b does SGW selection based on the Routing Area Identity corresponding to the UE's new Routing Area received in Step 1. The new SGSN 130b selects the new SGW 120b to serve the UE.

In Step 5, the new SGSN 130b sends a Context Acknowledge message to the old SGSN 130a. This message indicates that despite the change in SGW, ISR mode will be continued. In Step 6, the new SGSN 130b creates a new tunnel for the UE 110 to the new SGW 120b by sending a Create Session Request message. This message indicates that the reason for the new session is an SGW change and so the request is not to be forwarded to a PGW. Instead, the new SGW 120b sends a Modify Bearer Request message to the PGW instructing the PGW to direct UE's bearers tunnels towards the new SGW 120b. The Create Session Request message also includes an indication that ISR is to be continued. To facilitate this continuation, the message includes the MME's F-TEID towards old SGW. This F-TEID is used by the new SGW 120b to contact and direct signaling towards the MME 118 in parallel with the new SGSN 130b. In Step 7, the new SGW 120b sends a Create Session Response message to the new SGSN 130b. As the new SGW 120b supports ISR continuation, this message indicates that ISR continuation is supported. If the new SGW 120b did not support ISR continuation, this message would not contain this indication. Following Step 7, the new SGSN 130b has a tunnel towards the new SGW 120b and the new SGW 120b has tunnels towards both the new SGSN 130b and the MME 118.

In Step 8, the old SGSN 130a sends a Delete Session Request message to the old SGW 120a. This message indicates that the session is to be deleted but ISR mode is continuing. The old SGSN 130a thus does not does instruct the MME 118 to delete its bearers for the UE 110. In Step 9, the old SGW 120a locally deactivates its bearers. If the SGW 120a did not support ISR continuation then it informs the MME 118 to deactivate its bearers. In Step 10, the old SGW 120a sends a Delete Session Response message to the old SGSN 130a. This message indicates that the old SGW 120a supports ISR continuation and so the continuation was accepted.

In Step 11, the new SGSN 130b sends an ISR Update Request message to the MME 118. This message is sent to the MME 118 using the MME's F-TEID towards old SGSN as learned in Step 3. This message includes the new SGSN's F-TEID towards MME, the new SGSN's F-TEID towards new SGW and the SGW's F-TEID. Using the SGW's F-TEID, the MME 118 can establish a control tunnel with the new SGW 120b and continue ISR. The new SGSN's F-TEID towards MME and the new SGSN's F-TEID towards SGW are stored by the MME 118 so that the MME 118 can update a new MME and continue ISR if the MME 118 is later swapped out. If the Create Session Response message sent in Step 7 did not indicate that ISR continuation is supported, then the ISR Update Request message would indicate that ISR is to be discontinued. If the MME 118 received such an indication, it would deactivate its bearers for the UE 110. The MME 118 accepts ISR continuation unless it was instructed by the old SGW 120a to deactivate its bearers in Step 3. The MME 118 responds to the new SGSN 130b by sending an ISR Update Response message to the new SGSN 130b in Step 12. This message indicates whether the MME 118 accepted the ISR continuation.

If the MME 118 indicated that ISR Continuation is not accepted in Step 12, Steps 13 and 14 are run. In Step 13, the new SGSN 130b sends a Modify Bearer Request message to the new SGW 120b. This message indicates that ISR is deactivated. The new SGW 120b locally deactivates ISR. The new SGW 120b sends a Delete Bearer Request message to the MME 118. The MME 118 ignores this message because, in the case of ISR deactivation, its bearers for the UE 110 were deactivated in either Step 9 or Step 11. The new SGW 120b confirms that ISR was deactivated by sending a Modify Bearer Response message in Step 14.

In Step 15, a location update message flow is initiated by the new SGSN 130b. The new SGSN 130b sends an Update Location message to the HSS 124. This message requests that the HSS 124 store and distribute the new location of the UE 110 (the location corresponding to the Routing Area Identity received in Step 1). In Step 16, the HSS 124 sends a Cancel Location Message to the old SGSN 130a. The old SGSN 130a removes the UE 110 from its records. The old SGSN 130a confirms by sending a Cancel Location Answer in Step 17. The Update Location message sent in Step 15 did not contain Update Location Request flags with an Initial Attach indicator set and so the HSS 124 does not transmit a Cancel Location message to the MME 118. In Step 18, the HSS 124 confirms that the UE's location was updated by sending an Update Location Answer message in Step 18. The location update message flow is concluded.

The new SGSN 130b responds to the UE 110 by sending a Routing Area Update Accept message in Step 19. If ISR Continuation was accepted by the old SGW 120a, the new SGW 120b, and the MME 118, this message indicates that ISR mode is active. Otherwise, this message indicates that ISR is deactivated. In Step 20, the UE 110 confirms receipt by sending a Routing Area Update Complete message.

Figure 8A:
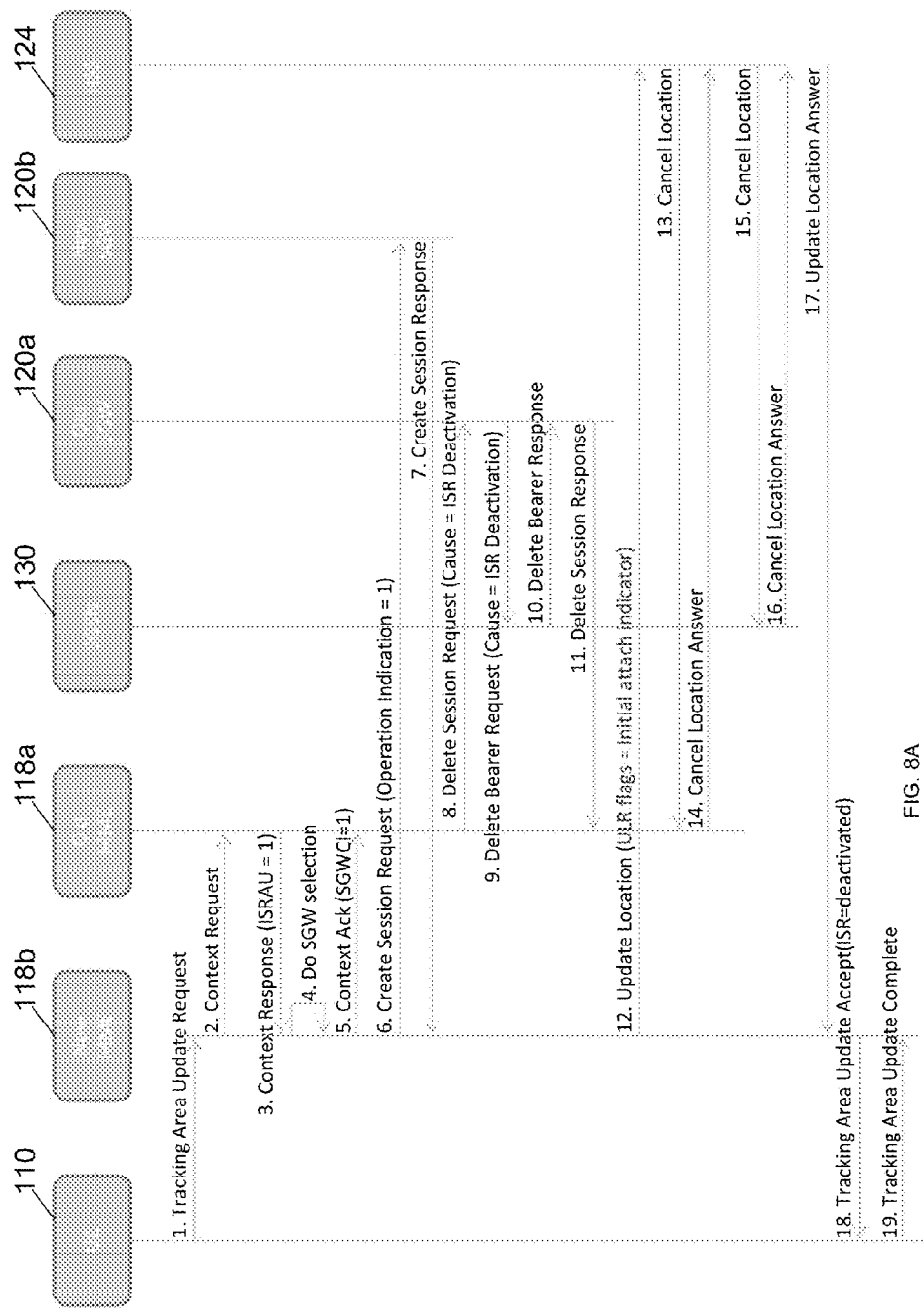

FIG. 8A is a message diagram illustrating a network handover procedure resulting in the deactivation of ISR. FIG. 8A includes UE 110, an old MME 118a, a new MME 118b, a SGSN 130, an old SGW 120a, a new SGW 120b, and an HSS 124. At the beginning of the procedure ISR is active on the UE 110, the old MME 118a, the SGSN 130, and the old SGW 120a. Both the old MME 118a and the SGSN 130 have control tunnels to the old SGW 120a. The UE 110 has been authenticated with the HSS 124, which is aware of the UE's location. The UE 110 has been moved to a tracking served by the new MME 118b. The UE 110, upon detecting this new Tracking Area, sends a Tracking Area Update Request message to the new MME 118b in Step 1. This message contains lists of Tracking Area Identities corresponding to both the UE's previous Tracking Areas and current Tracking Areas.

Using the Tracking Area Identities corresponding to the UE's previous Tracking Areas received in Step 1, the new MME 118b performs a DNS lookup to contact the old MME 118a in Step 2. The new MME 118b sends the old MME 118a a Context Request message. The context being requested contains the UE's mobility management context as described earlier. In Step 3, the old MME 118a responds with the requested context by sending a Context Response message in Step 3. This message also indicates that ISR was active for the UE 110 at the old MME 118a.

In Step 4, the new MME 118b selects the new SGW 120b based on the Tracking Area Identities corresponding to the UE's current Tracking Areas received in Step 1. In Step 5, the new MME 118b sends a Context Acknowledgement message to the old MME 118a. This message indicates that a new SGW 120b has been selected. In Step 6, the new MME 118b initiates the creation of a control tunnel for the UE 110 with the new SGW 120b. The new MME 118b does so by sending the new SGW 120b a Create Session Request message. This message indicates that the reason for this new tunnel is that the SGW has been re-selected and so the request is not to be forwarded to the PGW. Instead, the new SGW 120b sends a Modify Bearer Request message to the PGW instructing the PGW to direct the UE's bearers towards the new SGW 120b. The new SGW 120b responds with a Create Session Response message in Step 7.

In Step 8, the old MME 118a sends a Delete Session Request message to the old SGW 120a. This message indicates that ISR is to be deactivated. In response, the old SGW 120a deletes its bearers locally and sends a Delete Bearer Request message to SGSN 130 in Step 9. This message also indicates that ISR is to be deactivated. In Step 10, the SGSN 130 locally deactivates its bearers. If the SGSN 130 has any active bearers, it releases them. If the SGSN 130 is receiving the request for the last connection for the UE 110, it performs an implicit detach from that UE 110. The SGSN 130 sends a Delete Bearer responds to the old SGW 120a for each bearer that is deactivated. In Step 11, the old SGW 120a sends a Delete Session Response message to the old SGSN 130a confirming that the bearers were properly deactivated.

In Step 12, the new MME 118b begins a location update message flow by sending an Update Location message to the HSS 124. This message includes an Update Location Request flag set to indicate that this message is sent in response to an Initial Attach. The HSS 124 accordingly informs the old MME 118a and the SGSN 130 to cancel their respective location records for the UE 110, as ISR will be deactivated. In Step 13, the HSS 124 informs the old MME 118a of this change in a Cancel Location message. The old MME 118a confirms that it has removed the UE 110 from its records in Step 14 by sending a Cancel Location Answer message. In Step 15, the HSS 124 informs the SGSN 130 of this change in a Cancel Location message. The SGSN 130 confirms that it has removed the UE 110 from its records in Step 16 by sending a Cancel Location Answer message. In Step 17, the HSS 124 sends an Update Location Answer message to the new MME 118b confirming that the location was successfully updated on the HSS 124, the old MME 118a, and the SGSN 130.

In Step 18, the new MME 118b sends a Tracking Area Update Accept message to the UE 110 to complete the Tracking Area Update procedure that was initiated in Step 1. This message indicates that ISR has been deactivated. The UE sets its "Temporary Identity used in Next update" field equal to GUTI. The UE 110 confirms receipt by sending a Tracking Area Update Complete message to the new MME 118b in Step 19.

Figure 8B:
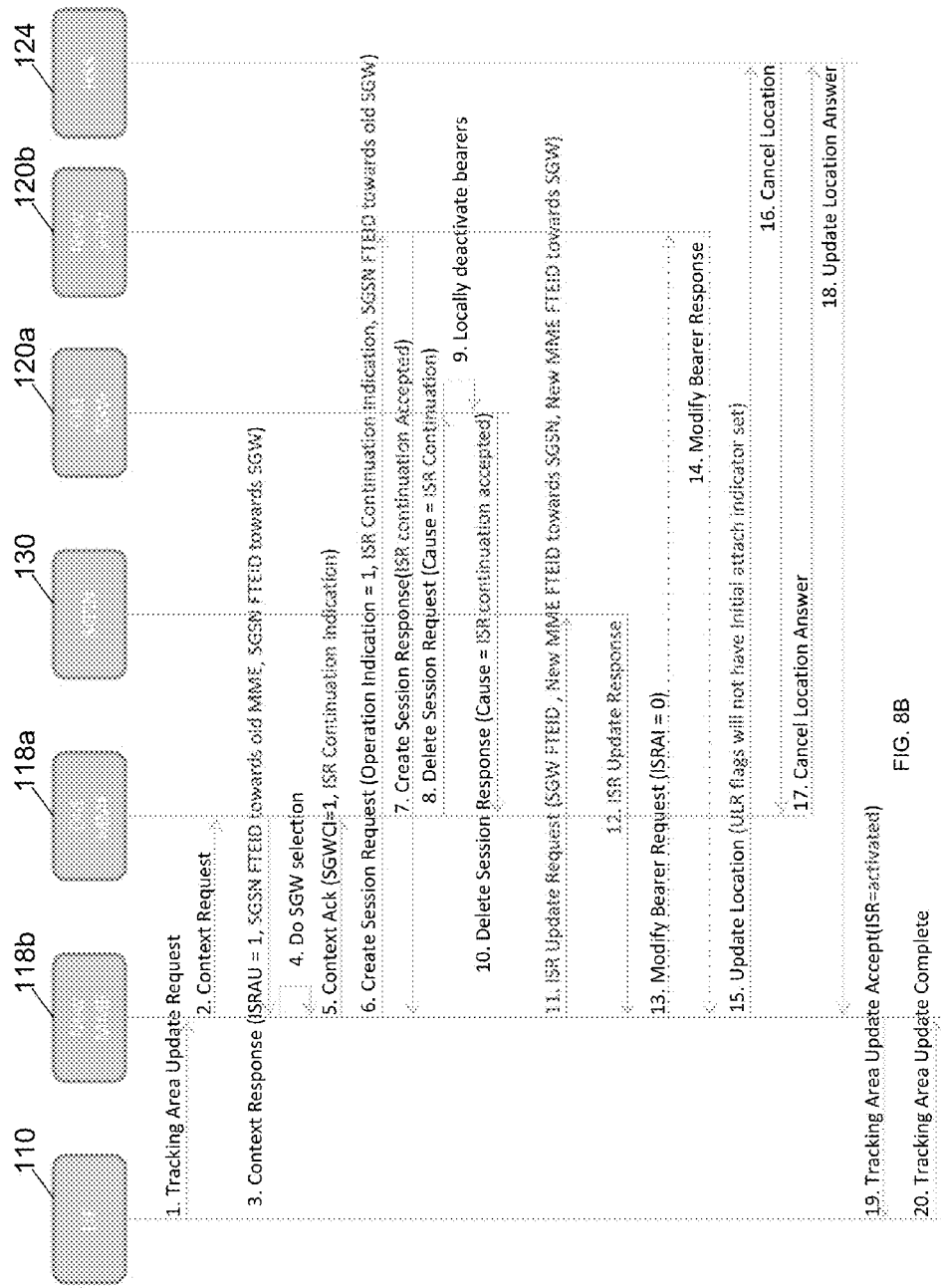

FIG. 8B is a message diagram illustrating a network handover procedure that continues ISR activation in accordance with some embodiments. FIG. 8B includes UE 110, an old MME 118a, a new MME 118b, an SGSN 130, an old SGW 120a, a new SGW 120b, and an HSS 124. At the beginning of the sequence ISR is active on the UE 110, the old MME 118a, the SGSN 130, and the old SGW 120a. The old MME 118a, the SGSN 130, and the old SGW 120a can support ISR continuation. Both the old MME 118a and the SGSN 130 have control tunnels to the old SGW 120a. The UE 110 has been authenticated with the HSS 124, which is aware of the UE's location. The UE 110 has been moved to a new tracking served by the new MME 118b. The UE 110, upon detecting this new Tracking Area, sends a Tracking Area Update Request message to the new MME 118b in Step 1. This message contains Tracking Area Identities corresponding to both the UE's previous Tracking Area(s) and UE's current Tracking Area(s).

Using the Tracking Area Identities corresponding to the UE's previous Tracking Area received in Step 1, the new MME 118b performs a DNS lookup to contact the old MME 118a in Step 2. The new MME 118b sends the old MME 118a a Context Request message. The context being requested contains the UE's mobility management context. In Step 3, the old MME 118a sends a Context Response message to the new MME 118b with the requested information. This response also indicates to the new MME 118b that ISR was active for the UE 110 at the old MME 118a. The context response additionally includes the SGSN's F-TEID towards old MME and the SGSN's F-TEID towards old SGW. In Step 4, the new MME 118b does SGW selection based on the Tracking Area Identities corresponding to the UE's new Tracking Area(s) received in Step 1. The new MME 118b selects the new SGW 120b to serve the UE 110.

In Step 5, the new MME 118b sends a Context Acknowledge message to the old MME 118a. This message indicates that despite the change in SGW, ISR mode will be continued. In Step 6, the new MME 118b creates a control tunnel for the UE 110 to the new SGW 120b by sending a Create Session Request message. This message indicates that the reason for the new session is an SGW change and so the request is not to be forwarded to a PGW. Instead, the new SGW 120b sends a Modify Bearer Request message to the PGW instructing the PGW to direct UE's bearers towards the new SGW 120b. The Create Session Request message also includes an indication that ISR is to be continued. To facilitate this continuation, the message includes the SGSN's F-TEID towards old SGW.

This F-TEID is used by the new SGW 120b. to contact and direct data towards the SGSN 130 in parallel with the new MME 118b. In Step 7, the new SGW 120b sends a Create Session Response message to the new MME 118b. As the new SGW 120b supports ISR continuation, this message indicates that ISR continuation is supported. If the new SGW 120b did not support ISR continuation, this message would not contain this indication. Following Step 7, the new MME 118b has a tunnel towards the new SGW 120b and the new SGW 120b has tunnels towards both the new MME 118b and the SGSN 130 (not shown).

In Step 8, the old MME 118a sends a Delete Session Request message to the old SGW 120a. This message indicates that the session is to be deleted but ISR mode is continuing. The old SGW 120a thus does not does instruct the SGSN 130 to delete its bearers for the UE 110. In Step 9, the old SGW 120a locally deactivates its bearers. If this SGW did not support ISR continuation then it would have informed the SGSN 130 to deactivate its bearers. In Step 10, the old SGW 120a sends a Delete Session Response message to the old MME 118a. This message indicates that the old SGW 120a supports ISR continuation and so the continuation was accepted.

In Step 11, the new MME 118b sends an ISR Update Request message to the SGSN 130. This message is sent to the SGSN using the SGSN's F-TEID towards old MME as learned in Step 3. This message includes the new MME's F-TEID towards SGSN, the new MME's F-TEID towards new SGW and the SGW's F-TEID. Using the SGW's F-TEID, the SGSN 130 can establish a control tunnel with the new SGW 120b and continue ISR. The new MME's F-TEID towards SGSN and the new MME's F-TEID towards SGW are stored by the SGSN 130 so that the SGSN 130 can update a new SGSN and continue ISR if the SGSN 130 is later swapped out. If the Create Session Response message sent in Step 7 did not indicate that ISR continuation is supported, then the ISR Update Request message would indicate that ISR is to be discontinued. If the SGSN 130 received such an indication, it would deactivate its bearers for the UE 110. The SGSN 130 accepts ISR continuation unless it was instructed by the old SGW 120a to deactivate its bearers in Step 3. The SGSN 130 responds to the new MME 118b by sending an ISR Update Response message to the new MME 118b in Step 12. This message indicates whether the SGSN 130 accepted the ISR continuation.

If the SGSN 130 indicated that ISR continuation is not accepted in Step 12, Steps 13 and 14 are run. In Step 13, the new MME 118b sends a Modify Bearer Request message to the new SGW 120b. This message indicates that ISR is deactivated. The new SGW 120b locally deactivates ISR. The new SGW 120b sends a Delete Bearer Response message to the SGSN 130. The SGSN 130 ignores this message because, in the case of ISR deactivation, its bearers for the UE 110 were deactivated in either Step 9 or Step 11. The new SGW 120b confirms that ISR was deactivated by sending a Modify Bearer Response message in Step 14.

In Step 15, a location update message flow is initiated by the new MME 118b. The new MME 118b sends an Update Location message to the HSS 124. This message requests that the HSS 124 store the new location of the UE 110 and distribute this information. In Step 16, the HSS sends a Cancel Location Message to the old MME 118a. The old MME 118a removes the UE 110 from its records. The old MME 118a confirms by sending a Cancel Location Answer in Step 17. The Update Location message sent in Step 15 did not contain Update Location Request flags with an Initial Attach indicator set and so the HSS 124 does not transmit a Cancel Location message to the SGSN 130. In Step 18, the HSS 124 confirms that the UE's location was updated by sending an Update Location Answer message in Step 18.

The new MME 118b responds to the UE 110 by sending a Tracking Area Update Accept message in Step 19. As ISR continuation was accepted by the old SGW 120a, the new SGW 120b and the SGSN 130, this message indicates that ISR mode is active. Otherwise, this message would have indicated that ISR is deactivated. In Step 20, the UE 110 confirms receipt by sending a Tracking Area Update Complete message.

Figure 9:
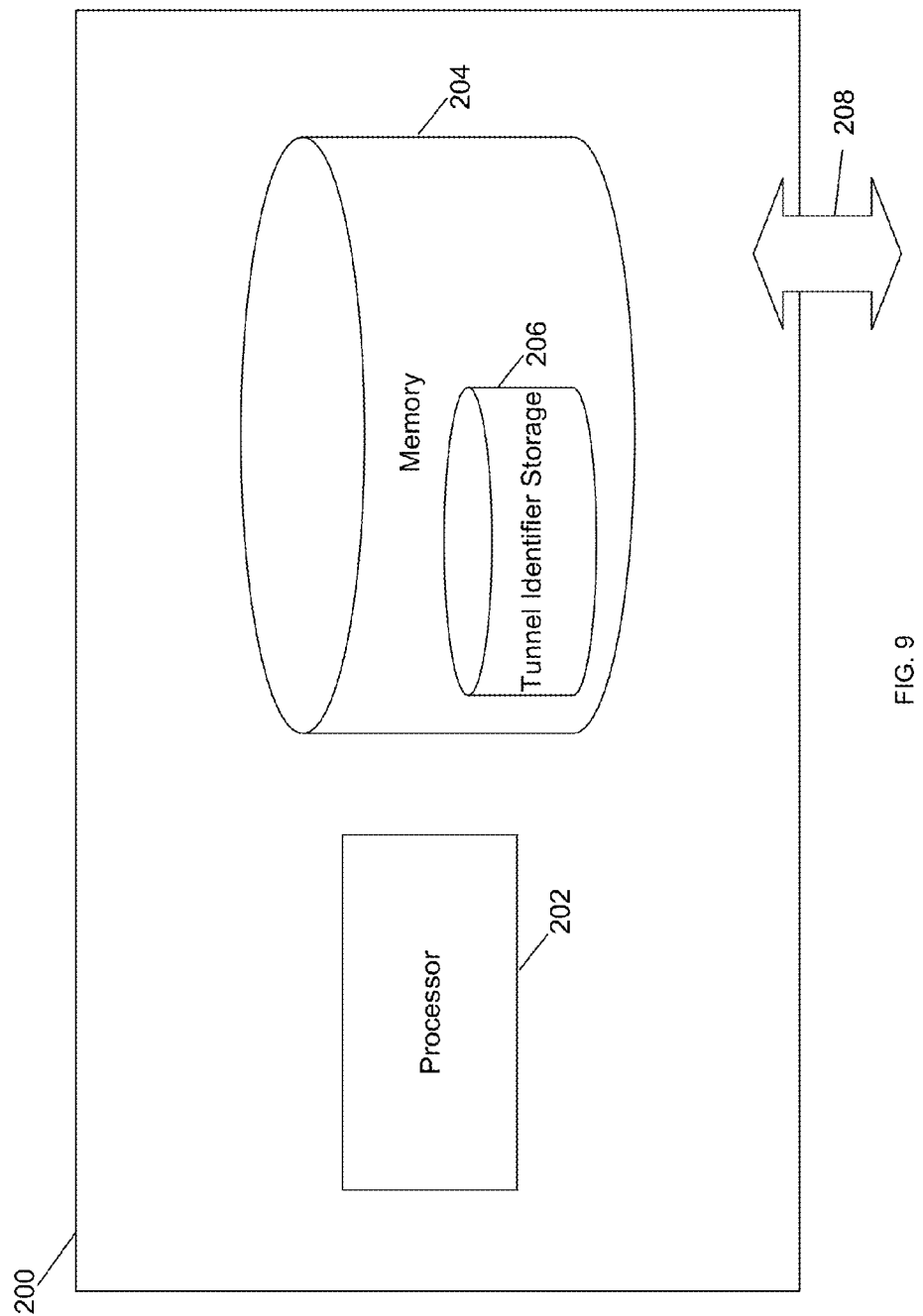
FIG. 9 illustrates a logical view of a wireless access node in accordance with some embodiments.

FIG. 9 illustrates a logical view of a wireless access node 200 in accordance with some embodiments. The wireless access node 200 can include one or more of a processor 202, a memory 204, a tunnel identifier storage 206 and an interface 208. An interface 208 can provide an input and/or output mechanism to communicate with other network devices. The interface 208 can provide communication with, for example, other gateways, wireless access nodes, application servers, and user equipment to send and receive data such as packets and messages. The interface 208 can be implemented in hardware to send and receive signals in a variety of mediums, such as optical, copper, and wireless, and in a number of different protocols some of which may be non-transient. A processor 202 runs software which uses the interface 208 and the memory 204 such as a tangible, non-transitory computer readable medium, a programmable read only memory (PROM), or flash memory. The processor 202 may be any computer chip that is capable of executing program instruction streams that are part of a software program. The processor 202 may have multiple cores for executing multiple streams of program instructions simultaneously. The processor 202 may also have multiple sub-processors which are optimized for executing particular categories of program instructions and are controlled by the processor 202. The memory 204 is capable of storing and retrieving program instructions, program data, or any other data that is used by the processor 204. The processor 202 may store and retrieve data from the memory 204 as a software program is executed. The memory 204 includes the tunnel identifier storage 206. The tunnel identifier storage 206 stores information used by the wireless access node 200 to maintain control connections with other nodes. The processor 202 accesses and updates the context data structures 206.

The wireless access node 200 includes software which is configured to activate ISR for a mobile device. ISR may be activated when a mobile device switches between radio access technologies. This may occur when the mobile device is registered with a peer wireless access node using a first radio access technology and then moves to an area served by the wireless access node 200 using a second radio access technology. This change is indicated by a location update request message received by the interface 208. For example, the wireless access node 200 may be a Serving GPRS Support Node (SGSN) whose interface 208 receives a Routing Area Update Request message. In this case, the peer wireless access node may be a Mobility Management Entity (MME). The software is configured to exchange control tunnel identifiers with this peer wireless access node using the interface 208. For example, the wireless access node 200 can provide the functionality of the SGSN 130 as illustrated in FIG. 2B.

In particular, during ISR activation, the software instructs the interface 208 to request context from the peer wireless access node so that the wireless access node 200 may obtain the information used to serve the mobile device. For example, this information may describe the subscription associated with the mobile device. The interface 208 is configured to receive two control tunnel identifiers from the peer wireless access node, both of which point to the peer wireless access node. For example, if the peer wireless access node is an MME, these control tunnel identifiers may be the MME's F-TEID towards SGW and the MME's F-TEID towards SGSN. The first of these control tunnel identifiers (e.g., an MME's F-TEID towards SGW) can be used by a gateway to establish a control tunnel with the peer wireless access node. The second of these control tunnel identifiers (e.g., an MME's F-TEID towards SGSN) can be used by a wireless access node to establish a control tunnel with the peer wireless access node. The wireless access node 200 stores these control tunnel identifiers in its tunnel identifier storage 206. The wireless access node 200 can use these control tunnel identifiers to communicate with the peer wireless access node or can share these identifiers with other nodes so that those nodes may communicate with the peer wireless access node.

During the ISR activation procedure, the interface 208 is further configured to transmit to the peer wireless access node two control tunnel identifiers, both of which point back to the wireless access node 206. For example, if the wireless access node 200 is an SGSN, these control tunnel identifiers may be the SGSN's F-TEID towards SGW and the SGSN's F-TEID towards MME. The first of these control tunnel identifiers (e.g., an SGSN's F-TEID towards SGW) can be used by a gateway to establish a control tunnel with the wireless access node 200. The second of these control tunnel identifiers (e.g., an SGSN's F-TEID towards MME) can be used by another wireless access node (e.g., a peer MME) to establish a control tunnel with the wireless access node 200. In some embodiments, these and other control tunnel identifiers may be Fully Qualified Tunnel Endpoint Identifiers (F-TEIDs) which point to the identified node by including an IP address of that node and a tunnel endpoint identifier. The tunnel endpoint identifier is used to distinguish between Fully Qualified Tunnel Endpoint Identifiers having the same IP address but which are used for connection by different node types or for connections on behalf of different UEs.

As mentioned above, these control tunnel identifiers are exchanged during the ISR activation procedure. The wireless access node 200 also contains software configured to initiate a bearer modification messaging flow with a gateway using the interface 208. During this flow, the interface 208 transmits a request that the bearers for the mobile device from the gateway be routed through the wireless access node 208. This transmission may include an indication that ISR mode is activated.

Once activated, ISR can be maintained when there is a gateway swap-out. This includes when there is a changeover of the SGW that is handling the communications of the mobile device. To provide this functionality, the wireless access node 200 additionally includes software which is configured to maintain ISR when a location update request message triggers the selection of a new gateway to serve the mobile device. For example, the wireless access node can provide the functionality of the SGSN 130 as illustrated in FIG. 5B or the MME 118 as illustrated in FIG. 6B. This location update request message may be, for example, a Routing Area Update Request message or a Tracking Area Update Request message. When a location update message is received, the wireless access node 200 may select a new gateway to serve the sending mobile device. This determination is based on the location information included in the message. If such a determination is made, the wireless access node 200 is configured to create a control tunnel towards the gateway for the mobile device. During this process, the interface 208 transmits to the gateway an indication that ISR activation is to be continued. The interface 208 also transmits the peer wireless access node's control tunnel identifier that was learned during ISR activation. This control tunnel identifier allows the gateway to establish a control tunnel with the peer wireless access node. After establishing this connection, the wireless access node 200 is configured to initiate an ISR update message flow with the peer wireless access node. During this flow, the interface 208 transmits a control identifier of the gateway to the peer wireless access node. This identifier is transmitted so that the peer wireless access node can establish a control tunnel with the gateway and continue to serve the mobile device in parallel with the wireless access node. This transmission is directed towards the peer wireless access node using the control tunnel identifier received from the peer wireless access node during the ISR activation procedure as mentioned above. Following these transmissions, the interface 208 is configured to respond to the mobile device's location update request message with an indication that ISR remains activated.

Once activated, ISR can be also maintained when there is a wireless access node swap-out. This includes when there is a changeover of the MME or SGSN that is managing the mobile device. For example, the wireless access node 200 can provide the functionality of the new SGSN 130b as illustrated in FIG. 3B or the new MME 118b as illustrated in FIG. 4B. To provide this functionality, the wireless access node 200 includes software which is configured to replace another wireless access node that has already activated ISR for a mobile device in conjunction with a peer wireless access node. This process may be triggered when the interface receives a location update request message from such a mobile device. The software is configured to communicate with the replaced wireless access node and obtain the information used to continue ISR and serve the mobile device in parallel with the peer wireless access node. The wireless access node 208 is configured to begin this process by requesting context for the mobile device from the replaced wireless access node. In response, the wireless access node uses the interface 208 to receive the two control tunnel identifiers that were learned by the replaced wireless access node from the peer wireless access node during the ISR activation procedure. The first control tunnel identifier can be transmitted to a new gateway (if a new gateway is later selected, as described above) so that the new gateway can establish a control tunnel with the peer wireless access node. The second control tunnel identifier can be used by the wireless access node 200, or another wireless access node that may later replace the wireless access node 200, to establish a control tunnel with the peer wireless access node. These control tunnel identifiers are stored in the tunnel identifier storage 206.

To continue this replacement process, the wireless access node 200 is configured to initiate an ISR update message flow with the peer wireless access node. During this flow, the interface 208 transmits two control tunnel identifiers of the wireless access node 200 to the peer wireless access node. The first of these control tunnel identifiers (e.g., an MME's F-TEID towards SGW) can be used by a gateway to establish a control tunnel with the wireless access node 200. The second of these control tunnel identifiers (e.g., an MME's F-TEID towards SGSN) can be used by another wireless access node (e.g., an SGSN) to establish a control tunnel with the wireless access node 200. These control tunnel identifiers replace the control tunnel identifiers that the peer wireless access node learned from the replaced wireless access node during ISR activation with that replace node.

During the process of substituting itself for the replaced wireless access node, the wireless access node 200 may additionally select a new gateway to serve the mobile device. For example, the wireless access node 200 can provide the functionality of the new SGSN 130*b* as illustrated in FIG. 7B or the new MME 118*b* as illustrated in FIG. 8B. As described above, the wireless access node 200 transmits to the new gateway an indication that ISR activation is to continue along with a control tunnel identifier of the peer wireless access node. As before, the new gateway may use this control tunnel identifier to create a control tunnel with the peer wireless access node. Alternatively, if the wireless access node 200 does not select a new gateway, the interface 208 transmits a request to the existing gateway that the bearers for the mobile device be routed through the wireless access node 200. This transmission includes an indication that ISR mode is to be activated.

The following table summarizes the parameters that may be included in messages sent and received by a wireless access node 200 in accordance with some embodiments:

| Parameter | Included in Message | Purpose of Parameter | Scenario in which parameter may be used |
|---|---|---|---|
| New SGSN's F-TEID towards MME | ISR Update Request | To inform a peer MME of the new SGSN's F-TEID towards the MME and continue ISR with the MME upon a SGSN-to-SGSN handover. | SGSN-to-SGSN handover when ISR is active. |
| New SGSN's F-TEID towards SGW | ISR Update Request | To inform a peer MME of the new SGSN's F-TEID towards the SGW. The MME can use this F-TEID on future SGW reselection to continue ISR with new SGW. | SGSN-to-SGSN handover (with or without SGW reselection) when ISR is active. |
| New MME's F-TEID towards SGSN | ISR Update Request | To inform a peer SGSN of the new MME's F-TEID towards the SGSN and continue ISR with the SGSN upon an MME-to-MME handover. | MME-to-MME handover when ISR is active. |
| New MME's F-TEID towards SGW | ISR Update Request | To inform a peer SGSN of the new MME's F-TEID towards the SGW. The SGSN can use this F-TEID on future SGW reselection to continue ISR with new SGW. | MME-to-MME handover (with or without SGW reselection) when ISR is active. |
| SGW's F-TEID | ISR Update Request | To inform an SGSN or MME of new SGW's F-TEID towards SGSN/MME, when a peer SGSN/MME selects a new SGW. | SGSN-to-SGSN handover with SGW reselection or MME-to-MME handover with SGW reselection. |
| Cause = Accepted | ISR Update Response | Cause code indicating that ISR continuation was accepted by a peer wireless access node. | All of the above situations. |

User Equipment and Gateway

The user equipment described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as those known by the marks and names, SYMBIAN OS, IPHONE OS, RIM'S BLACKBERRY, WINDOWS MOBILE, LINUX, PALM WEBOS, and ANDROID. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The wireless access node described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

Figure 10:
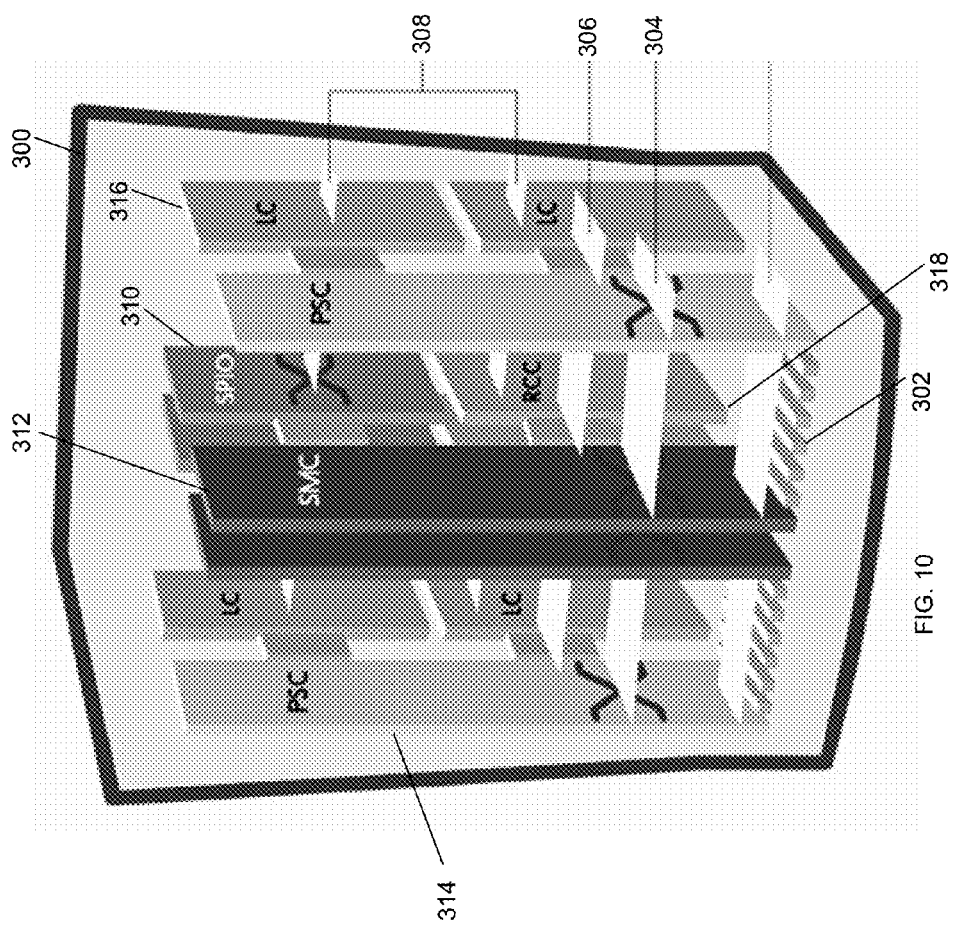
FIG. 10 illustrates a network device in accordance with some embodiments.

In certain embodiments, the functionalities are provided by a combination of hardware and software in the network device. General purpose hardware can be configured in the network device to provide one or more of these specialized functionalities. In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 10 illustrates the implementation of a network device in accordance with some embodiments. The network device 300 includes slots 302 for loading application cards and line cards. A midplane can be used in the network device to provide intra-network device communications, power connections, and transport paths between the various installed cards. The midplane can include buses such as a switch fabric 304, a control bus 306, a system management bus, a redundancy bus 308, and a time division multiplex (TDM) bus. The switch fabric 304 is an IP-based transport path for user data throughout the network device implemented by establishing inter-card communications between application cards and line cards. The control bus 306 interconnects the control and management processors within the network device. The network device management bus provides management of system functions such as supplying power, monitoring temperatures, board status, data path errors, card resets, and other failover features. The redundancy bus 308 provides transportation of user data and redundancy links in the event of hardware failures. The TDM bus provides support for voice services on the system.

The network device supports at least four types of application cards: a switch processor I/O card (SPIO) 310, a system management card (SMC) 312, a packet service card (PSC) 314, and a packet accelerator card (not shown). Other cards used in the network device include line cards 466 and redundant crossbar cards (RCC) 318. The line cards 316, when loaded in the network device, provide input/output connectivity to the network and other devices, as well as redundancy connections. The line cards 316 include interfaces to the network through Ethernet, Fiber Optic, and the other communication mediums. The redundant crossbar card (RCC) 318 includes a non-blocking crossbar and connections to each of the cards in the network device. This allows a redundant connection to be made through the redundant crossbar card 318 from any one card to any other card in the network device. The SPIO card 310 serves as a controller of the network device and is responsible for such things as initializing the network device and loading software configurations onto other cards in the network device.

The system management card (SMC) 312 and switch processor card (not shown) are system control and management cards for managing and controlling other cards in the network device. The packet accelerator card (PAC) and packet service card (PSC) 314 provide packet processing, context processing capabilities, and forwarding capabilities among other things. The PAC and PSC 314 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a LINUX software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 11:
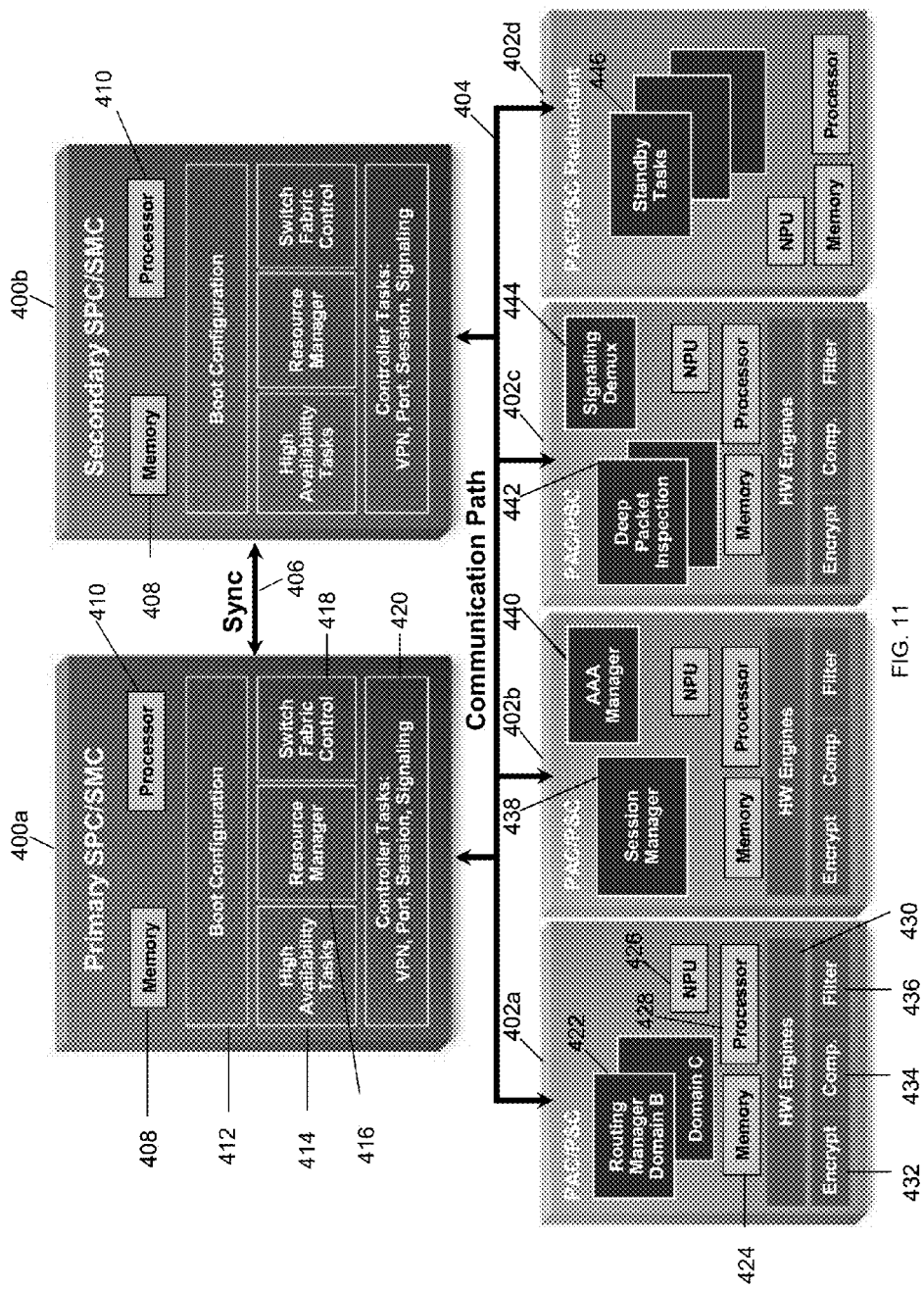
FIG. 11 illustrates a logical view of the software architecture of a network device in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 11 illustrates a logical view of the software architecture of a network device in accordance with certain embodiments. As shown, the software and hardware can be distributed within the network device and across different circuit boards, processors, and memory. FIG. 11 includes a primary switch processor card (SPC)/system management card (SMC) 400a, a secondary SPC/SMC 400b, PAC/PSC 402a-402d, a communication path 404, and a synchronization path 406. The SPC/SMC 400 include a memory 408, a processor 410, a boot configuration 412, high availability tasks 414, resource manager 416, switch fabric control 418, and controller tasks 420.

The SPC/SMC 400 manage and control the network device including the other cards in the network device. The SPC/SMC 400 can be configured in a primary and secondary arrangement that provides redundancy and failsafe protection. The modules or tasks running on the SPC/SMC 400 are related to network device wide control and management. The boot configuration task 412 includes information for starting up and testing the network device. The network device can also be configured to startup in different configurations and providing different implementations. These can include which functionalities and services are capable of running on the SPC/SMC 400. The high availability task 414 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 400 or a PAC/PSC 402, while some processor intensive tasks can also be performed across multiple PACs/PSCs to utilize multiple CPU resources. Distribution of these tasks is invisible to the user. The switch fabric control 418 controls the communication paths in the network device. The controller tasks module 420 can manage the tasks among the resources of the networks to provide, for example, VPN services, assign ports, and create, delete, and modify sessions for user equipment.

The PAC/PSC 402 are high-speed processing cards that are designed for packet processing and the tasks involved with providing various network functionalities on the network device. The PAC/PSC 402 include a memory 424, a network processing unit (NPU) 426, a processor 428, a hardware engine 430, an encryption component 432, a compression component 434, and a filter component 436. Hardware engines 430 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 402 is capable of supporting multiple contexts. The PAC/PSC 402 are also capable of running a variety of tasks or modules. PAC/PSC 402*a* provides routing managers 422 with each covering routing of a different domain. PAC/PSC 402*b* provides a session manager 438 and an AAA manager 440. The session manager 438 manages one or more sessions that correspond to one or more user equipment. A session allows a user equipment to communicate with the network for voice calls and data. The AAA manager 440 manages accounting, authentication, and authorization with an AAA server in the network. PAC/PSC 402 provides a deep packet inspection task 442 and a signaling demux 444. The deep packet inspection task 442 provides inspection of packet information beyond layer 4 for use and analysis by the network device. The signaling demux 444 can provide scalability of services in combination with other modules. PAC/PSC 402*d* provides redundancy through standby tasks 446. Standby tasks 446 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

We claim:

1. A method comprising: activating a signaling reduction mode on a wireless access node for a mobile device in an idle state where the signaling reduction mode permits the mobile device to switch radio access technologies while maintaining registration with both the wireless access node and a peer wireless access node; exchanging with the peer wireless access node a first control tunnel identifier of the wireless access node and a second control tunnel identifier of the peer wireless access node; selecting at the wireless access node a second gateway to replace a first gateway; establishing a control connection with the second gateway; transmitting to the second gateway the second control tunnel identifier of the peer wireless access node so that the second gateway may establish a control connection with the peer wireless access node; and continuing the signaling reduction mode, wherein the signaling reduction mode is activated when the mobile device is already attached to the peer wireless access node using a first radio access technology and, at the time of activation, attaches to the wireless access node using a second radio access technology.

2. A method comprising: activating a signaling reduction mode on a wireless access node for a mobile device in an idle state where the signaling reduction mode permits the mobile device to switch radio access technologies while maintaining registration with both the wireless access node and a peer wireless access node; exchanging with the peer wireless access node a first control tunnel identifier of the wireless access node and a second control tunnel identifier of the peer wireless access node; selecting at the wireless access node a second gateway to replace a first gateway; establishing a control connection with the second gateway; transmitting to the second gateway the second control tunnel identifier of the peer wireless access node so that the second gateway may establish a control connection with the peer wireless access node; and continuing the signaling reduction mode, further comprising instructing the first gateway to locally deactivate its bearers for the mobile device but not to forward an instruction to the peer wireless access node.

3. The method of claim 1, further comprising transmitting to the peer wireless access node a third control tunnel identifier of the second gateway.

4. The method of claim 1, wherein the signaling reduction mode is the Idle state Signaling Reduction (ISR) mode.

5. The method of claim 1, wherein the wireless access node is a Mobility Management Entity (MME) and the peer wireless access node is a Serving GPRS Support Node (SGSN).

6. The method of claim 1, wherein the wireless access node is a Serving GPRS Support Node (SGSN) and the peer wireless access node is a Mobility Management Entity (MME).

7. The method of claim 1, wherein the selection of the second gateway is triggered by the receipt of a location update request message from the mobile device, the mobile device having moved to a different location from which the mobile device initially attached to either the wireless access node or the peer wireless access node.

8. The method of claim 7, wherein the location update request message is a Tracking Area Update Request message or a Routing Area Update Request message.

9. The method of claim 1, further comprising transmitting an indication to the mobile device that a signaling reduction mode active on the mobile device is to continue.

10. The method of claim 1, wherein each of the control tunnel identifiers is a Fully Qualified Tunnel Endpoint Identifier (F-TEID) comprising at least an Internet Protocol (IP) address and a tunnel endpoint identifier.

11. A method comprising: receiving at a first wireless access node a location update request message from a mobile device in a signaling reduction mode, the signaling reduction mode permitting the mobile device to switch radio access technologies while maintaining registration with both a second wireless access node and a peer wireless access node; receiving from the second wireless access node a first control tunnel identifier of the peer wireless access node; transmitting to the peer wireless access node a second control tunnel identifier of the first wireless access node, the transmission using the first control tunnel identifier of the peer wireless access node; and continuing the signaling reduction mode so that the mobile device can switch radio access technologies while maintaining registration with both the first wireless access node and a peer wireless access node.

12. The method of claim 11, further comprising: selecting at the first wireless access node a second gateway to replace a previously selected first gateway and establishing a control connection with the second gateway; transmitting to the second gateway the first control tunnel identifier of the peer wireless access node so that the second gateway may establish a control connection with the peer wireless access node; and transmitting to the peer wireless access node a third control tunnel identifier of the second gateway.

13. The method of claim 12, further comprising instructing the first gateway to locally deactivate its bearers for the mobile device but not to forward an instruction to the peer wireless access node.

14. The method of claim 11, wherein the signaling reduction mode is the Idle state Signaling Reduction (ISR) mode.

15. The method of claim 11, further comprising transmitting to a gateway serving the mobile device an instruction to continue the signaling reduction mode and to route the bearers for the mobile device through the first wireless access node.

16. The method of claim 11, further comprising transmitting an indication to the mobile device that a signaling reduction mode active on the mobile device is to continue.

17. A wireless access node comprising: an interface that is configured to provide communication with other network devices, exchange with a peer wireless access node a first control tunnel identifier of the wireless access node and a second control tunnel identifier of the peer wireless access node, and transmit to a second gateway the second control tunnel identifier of the peer wireless access node; a memory that is configured to store a module; and a processor that is configured to run the module stored in memory to activate a signaling reduction mode for a mobile device in an idle state where the signaling reduction mode permits the mobile device to switch radio access technologies while maintaining registration with both the wireless access node and a peer wireless access node and to continue the signaling reduction mode when the second gateway is selected to replace a first gateway, wherein the signaling reduction mode is activated when the mobile device is already attached to the peer wireless access node using a first radio access technology and, at the time of activation, attaches to the wireless access node using a second radio access technology.

18. The wireless access node of claim 17, wherein the signaling reduction mode is the Idle state Signaling Reduction (ISR) mode.

19. The method of claim 2, wherein the selection of the second gateway is triggered by the receipt of a location update request message from the mobile device, the mobile device having moved to a different location from which the mobile device initially attached to either the wireless access node or the peer wireless access node.

20. The method of claim 2, wherein the wireless access node is one of a Mobility Management Entity (MME) or a Serving GPRS Support Node (SGSN), and peer access node is the other of a Mobility Management Entity (MME) or a Serving GPRS Support Node (SGSN).

\* \* \* \* \*